(12) United States Patent
Joo et al.

(10) Patent No.: US 9,691,353 B2
(45) Date of Patent: Jun. 27, 2017

(54) DISPLAY DEVICE AND METHOD OF ADJUSTING LUMINANCE OF A LOGO REGION OF AN IMAGE DISPLAYED ON THE SAME

(71) Applicant: Samsung Display Co., Ltd., Yongin, Gyeonggi-do (KR)

(72) Inventors: Mi-Young Joo, Hwaseong-si (KR); Seung-Ho Park, Suwon-si (KR); Kang-Hee Lee, Suwon-si (KR); Myung-Hee Han, Seoul (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 35 days.

(21) Appl. No.: 14/793,554

(22) Filed: Jul. 7, 2015

(65) Prior Publication Data

US 2016/0225344 A1 Aug. 4, 2016

(30) Foreign Application Priority Data

Feb. 3, 2015 (KR) .......................... 10-2015-0016561

(51) Int. Cl.
| | |
|---|---|
| G09G 5/10 | (2006.01) |
| G09G 5/14 | (2006.01) |
| G06K 9/46 | (2006.01) |
| G06T 11/00 | (2006.01) |
| G06T 11/60 | (2006.01) |
| G06T 5/40 | (2006.01) |
| G06T 5/00 | (2006.01) |

(Continued)

(52) U.S. Cl.
CPC ................ *G09G 5/10* (2013.01); *G06K 9/46* (2013.01); *G06K 9/4642* (2013.01); *G09G 5/14* (2013.01); *G06K 2009/4666* (2013.01); *G09G 2320/0613* (2013.01); *G09G 2320/0673* (2013.01); *G09G 2320/0686* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0097436 A1* | 7/2002 | Yokoyama | ............. | H04N 1/644 358/2.1 |
| 2009/0295768 A1* | 12/2009 | Shin | ..................... | G09G 3/3648 345/204 |
| 2015/0062197 A1* | 3/2015 | Jung | .................... | G09G 3/2003 345/690 |

FOREIGN PATENT DOCUMENTS

| | | |
|---|---|---|
| KR | 10-2012-0019907 A | 3/2012 |
| KR | 10-2014-0070792 A | 6/2014 |

(Continued)

*Primary Examiner* — Wesner Sajous
(74) *Attorney, Agent, or Firm* — Knobbe, Martens, Olson & Bear, LLP

(57) ABSTRACT

A display device and method of adjusting luminance of a logo region of an image displayed on the same are disclosed. In one aspect, the display device includes a display panel configured to display an image including a logo region and a display driving integrated circuit configured to detect a logo estimate region of the image and determine a logo surrounding region that surrounds the logo estimate region. The integrated circuit is further configured to analyze a histogram of the logo surrounding region so as to determine a background maximum luminance, determine a high-gray-scale maximum luminance of the logo estimate region based on the background maximum luminance and adjust a gamma curve of the logo estimate region.

20 Claims, 17 Drawing Sheets

(51) Int. Cl.
  *H04N 1/40*   (2006.01)
  *H04N 1/60*   (2006.01)
  *H04N 9/69*   (2006.01)
  *H04N 9/73*   (2006.01)
  *H04N 5/202*  (2006.01)

(56) References Cited

FOREIGN PATENT DOCUMENTS

KR  10-2014-0070793 A  6/2014
KR  10-2014-0070795 A  6/2014

* cited by examiner

DISPLAY DEVICE AND METHOD OF ADJUSTING LUMINANCE OF A LOGO REGION OF AN IMAGE DISPLAYED ON THE SAME

CROSS-REFERENCE TO RELATED APPLICATION(S)

This application claims priority under 35 USC §119 to Korean Patent Application No. 10-2015-0016561, filed on Feb. 3, 2015 in the Korean Intellectual Property Office (KIPO), the contents of which are incorporated herein in its entirety by reference.

BACKGROUND

Field

The described technology generally relates to a display device and a method of adjusting the luminance of a logo region of an image displayed on the same.

Description of the Related Technology

The pixels of a display device degrade or deteriorate as the display device is used over extended periods of time. Thus, display devices compensate image data applied to the degraded pixels such that the degraded pixels emit light with substantially the same luminance as a non-degraded pixel under substantially the same conditions. However, since this type of compensation is limited, a viewer may observe or perceive reduced accuracy in luminance reproduction due to the pixel degradation.

Typically, a logo region of an image displayed on a display panel includes a subtitle, a character string, a figure, etc. For example, the logo region of the image can indicate the source of the image (e.g., CNN, KBS, MBC, etc.). The logo region of the image typically has a relatively high gray-scale (i.e., relatively high luminance) compared to a non-logo region of the image such that the logo region is visible regardless of the displayed image. This leads to the logo region of the image causing increased pixel degradation in the logo region than in the non-logo region of the image. As a result, the difference between the pixel degradation due to the logo region of the image and the pixel degradation due to the non-logo region of the image increases, and thus, a permanent afterimage caused due to the luminance difference or a color difference between the logo region of the image and the non-logo region of the image can be observed by the viewer.

SUMMARY OF CERTAIN INVENTIVE ASPECTS

One inventive aspect is a display device that can alleviate or reduce a permanent afterimage from being formed due to a luminance difference or a color difference between a logo region and a non-logo region of an image displayed on a display panel by efficiently reducing the luminance of the logo region without the need for accurately detecting the logo region.

Another aspect is a method of adjusting the luminance of a logo region of an image for a display device that can alleviate a permanent afterimage from being formed due to a luminance difference or a color difference between the logo region and a non-logo region of the image by efficiently reducing the luminance of the logo region without the need for accurately detecting the logo region of the image.

Another aspect is a display device including a display panel configured to display an image including a logo region and a display driving integrated circuit configured to drive the display panel. Here, the display driving integrated circuit can detect a logo estimate region of the image that surrounds the logo region of the image, determine a logo surrounding region of the image that surrounds the logo estimate region of the image, analyze a histogram of the logo surrounding region of the image to detect background maximum luminance of the logo surrounding region of the image, determine high-gray-scale maximum luminance of the logo estimate region of the image based on the background maximum luminance of the logo surrounding region of the image, and adjust a gamma curve of the logo estimate region of the image to control luminance of an entire gray-scale range of the gamma curve of the logo estimate region of the image to be less than the high-gray-scale maximum luminance of the logo estimate region of the image.

In example embodiments, the logo estimate region of the image can have a height that is greater than or equal to a maximum height of the logo region of the image and a width that is greater than or equal to a maximum width of the logo region of the image.

In example embodiments, the display driving integrated circuit can determine the background maximum luminance of the logo surrounding region of the image to be maximum luminance of a single color of the logo surrounding region of the image when the logo surrounding region of the image has the single color.

In example embodiments, the display driving integrated circuit can determine the background maximum luminance of the logo surrounding region of the image to be the highest luminance among maximum luminance of a red color, maximum luminance of a green color, and maximum luminance of a blue color of the logo surrounding region of the image when the logo surrounding region of the image has multiple colors including the red color, the green color, and the blue color.

In example embodiments, the display driving integrated circuit can determine the high-gray-scale maximum luminance of the logo estimate region of the image within a predetermined range with respect to the background maximum luminance of the logo surrounding region of the image.

In example embodiments, the display driving integrated circuit can reduce luminance of a high-gray-scale range that is greater than a predetermined gray-scale on the gamma curve of the logo estimate region of the image.

In example embodiments, the display driving integrated circuit can increase luminance of a low-gray-scale range that is less than the predetermined gray-scale on the gamma curve of the logo estimate region of the image.

In example embodiments, the display driving integrated circuit can adjust a gamma curve of the logo surrounding region of the image based on high-gray-scale maximum luminance of the logo surrounding region of the image when the display driving integrated circuit adjusts the gamma curve of the logo estimate region of the image.

In example embodiments, the display driving integrated circuit can determine the high-gray-scale maximum luminance of the logo surrounding region of the image to be greater than the high-gray-scale maximum luminance of the logo estimate region of the image. In addition, the display driving integrated circuit can increase the high-gray-scale maximum luminance of the logo surrounding region of the image as a distance from the logo estimate region of the image increases.

In example embodiments, the display driving integrated circuit can selectively adjust the high-gray-scale maximum luminance of the logo estimate region of the image based on a size of the logo estimate region of the image under substantially the same condition.

In example embodiments, the display driving integrated circuit can increase the high-gray-scale maximum luminance of the logo estimate region of the image as the size of the logo estimate region of the image increases.

In example embodiments, the display driving integrated circuit may not adjust the high-gray-scale maximum luminance of the logo estimate region of the image when the size of the logo estimate region of the image is less than a predetermined low-limit size.

In example embodiments, the display driving integrated circuit can set the high-gray-scale maximum luminance of the logo estimate region of the image to be a maximum value supported by the display panel when the size of the logo estimate region of the image is larger than a predetermined high-limit size.

In example embodiments, the display driving integrated circuit can include a scan driver configured to provide a scan signal to the display panel, a data driver configured to provide a data signal to the display panel, a logo controller configured to adjust the gamma curve of the logo estimate region of the image, and a timing controller configured to control the scan driver, the data driver, and the logo controller.

In example embodiments, the logo controller can be located inside the timing controller or outside the timing controller to interact with the timing controller.

Another aspect is a method of adjusting luminance of a logo region of an image displayed on a display panel including an operation of detecting a logo estimate region of the image that surrounds the logo region of the image, an operation of determining a logo surrounding region of the image that surrounds the logo estimate region of the image, an operation of detecting background maximum luminance of the logo surrounding region of the image by analyzing a histogram of the logo surrounding region of the image, an operation of determining high-gray-scale maximum luminance of the logo estimate region of the image based on the background maximum luminance of the logo surrounding region of the image, and an operation of adjusting a gamma curve of the logo estimate region of the image to control luminance of an entire gray-scale range of the gamma curve of the logo estimate region of the image to be less than the high-gray-scale maximum luminance of the logo estimate region of the image.

In example embodiments, the logo estimate region of the image can have a height that is greater than or equal to a maximum height of the logo region of the image and a width that is greater than or equal to a maximum width of the logo region of the image.

In example embodiments, the background maximum luminance of the logo surrounding region of the image can be determined to be maximum luminance of a single color of the logo surrounding region of the image when the logo surrounding region of the image has the single color.

In example embodiments, the background maximum luminance of the logo surrounding region of the image can be determined to be the highest luminance among maximum luminance of a red color, maximum luminance of a green color, and maximum luminance of a blue color of the logo surrounding region of the image when the logo surrounding region of the image has multiple colors including the red color, the green color, and the blue color.

In example embodiments, the high-gray-scale maximum luminance of the logo estimate region of the image can be determined within a predetermined range with respect to the background maximum luminance of the logo surrounding region of the image.

Another aspect is a display device comprising a display panel configured to display an image including a logo region; and a display driving integrated circuit configured to drive the display panel, wherein the display driving integrated circuit is further configured to: detect a logo estimate region of the image that surrounds the logo region of the image; determine a logo surrounding region of the image that surrounds the logo estimate region of the image; analyze a histogram of the logo surrounding region of the image so as to determine a background maximum luminance of the logo surrounding region of the image; determine a high-gray-scale maximum luminance of the logo estimate region of the image based at least in part on the background maximum luminance of the logo surrounding region of the image; and adjust a gamma curve of the logo estimate region of the image to control luminance of an entire gray-scale range of the gamma curve of the logo estimate region of the image so as to be less than the high-gray-scale maximum luminance of the logo estimate region of the image.

In example embodiments, the logo estimate region of the image has: i) a height that is greater than or equal to a maximum height of the logo region of the image and ii) a width that is greater than or equal to a maximum width of the logo region of the image. The display driving integrated circuit can be further configured to determine the background maximum luminance of the logo surrounding region of the image to be a maximum luminance of a single color of the logo surrounding region of the image when the logo surrounding region of the image includes only the single color.

In example embodiments, the display driving integrated circuit is further configured to determine the background maximum luminance of the logo surrounding region of the image to be the greatest luminance among a maximum luminance of a red color, a maximum luminance of a green color, and a maximum luminance of a blue color of the logo surrounding region of the image when the logo surrounding region of the image has multiple colors including the red color, the green color, and the blue color.

In example embodiments, the display driving integrated circuit is further configured to determine the high-gray-scale maximum luminance of the logo estimate region of the image within a predetermined range with respect to the background maximum luminance of the logo surrounding region of the image. The display driving integrated circuit can be further configured to reduce luminance of a high-gray-scale range that is greater than a predetermined gray-scale on the gamma curve of the logo estimate region of the image. The display driving integrated circuit can be further configured to increase luminance of a low-gray-scale range that is less than the predetermined gray-scale on the gamma curve of the logo estimate region of the image.

In example embodiments, the display driving integrated circuit can be further configured to adjust a gamma curve of the logo surrounding region of the image based at least in part on a high-gray-scale maximum luminance of the logo surrounding region of the image when the display driving integrated circuit adjusts the gamma curve of the logo estimate region of the image. The display driving integrated circuit can be further configured to determine the high-gray-scale maximum luminance of the logo surrounding region of the image to be greater than the high-gray-scale maximum luminance of the logo estimate region of the image; and increase the high-gray-scale maximum luminance of the logo surrounding region of the image as the distance from the logo estimate region of the image increases.

In example embodiments, the display driving integrated circuit is further configured to selectively adjust the high-gray-scale maximum luminance of the logo estimate region of the image based at least in part on the area of the logo estimate region of the image. The display driving integrated circuit can be further configured to increase the high-gray-scale maximum luminance of the logo estimate region of the image as the size of the logo estimate region of the image increases.

In example embodiments, the display driving integrated circuit is further configured to not adjust the high-gray-scale maximum luminance of the logo estimate region of the image when the size of the logo estimate region of the image is less than a predetermined low-limit size. The display driving integrated circuit can be further configured to set the high-gray-scale maximum luminance of the logo estimate region of the image to be a maximum value supported by the display panel when the size of the logo estimate region of the image is greater than a predetermined high-limit size.

In example embodiments, the display driving integrated circuit comprises a scan driver configured to provide a plurality of scan signals to the display panel; a data driver configured to provide a plurality of data signals to the display panel; a logo controller configured to adjust the gamma curve of the logo estimate region of the image; and a timing controller configured to control the scan driver, the data driver, and the logo controller. The logo controller can be located inside the timing controller or outside of the timing controller and the logo controller can be configured to communicate with the timing controller.

Another aspect is a method of adjusting luminance of a logo region of an image displayed on a display panel, the method comprising detecting a logo estimate region of the image that surrounds the logo region of the image; determining a logo surrounding region of the image that surrounds the logo estimate region of the image; detecting a background maximum luminance of the logo surrounding region of the image via analyzing a histogram of the logo surrounding region of the image; determining a high-gray-scale maximum luminance of the logo estimate region of the image based at least in part on the background maximum luminance of the logo surrounding region of the image; and adjusting a gamma curve of the logo estimate region of the image so as to control luminance of an entire gray-scale range of the gamma curve of the logo estimate region of the image to be less than the high-gray-scale maximum luminance of the logo estimate region of the image.

In example embodiments, the logo estimate region of the image has a height that is greater than or equal to a maximum height of the logo region of the image and a width that is greater than or equal to a maximum width of the logo region of the image.

In example embodiments, the method further comprises determining the background maximum luminance of the logo surrounding region of the image to be a maximum luminance of a single color of the logo surrounding region of the image when the logo surrounding region of the image includes only the single color.

In example embodiments, the method further comprises determining the background maximum luminance of the logo surrounding region of the image to be the highest luminance among a maximum luminance of a red color, a maximum luminance of a green color, and a maximum luminance of a blue color of the logo surrounding region of the image when the logo surrounding region of the image has multiple colors including the red color, the green color, and the blue color.

In example embodiments, the method further comprises determining the high-gray-scale maximum luminance of the logo estimate region of the image within a predetermined range with respect to the background maximum luminance of the logo surrounding region of the image.

Therefore, according to at least one embodiment, the display device can alleviate or reduce a permanent afterimage due to a luminance difference or a color difference between a logo region of an image displayed on a display panel and a non-logo region of the image by detecting a logo estimate region of the image, determining a logo surrounding region of the image that surrounds the logo estimate region of the image, analyzing a histogram of the logo surrounding region of the image to detect background maximum luminance of the logo surrounding region of the image, determining high-gray-scale maximum luminance of the logo estimate region of the image based on the background maximum luminance of the logo surrounding region of the image, and adjusting a gamma curve of the logo estimate region of the image based on the high-gray-scale maximum luminance of the logo estimate region of the image. Thus, the display device can efficiently reduce luminance of the logo region of the image without the need for accurately detecting the logo region of the image.

In addition, according to at least one embodiment, a method of adjusting luminance of a logo region of an image for a display device can alleviate a permanent afterimage due to a luminance difference or a color difference between the logo region of the image and a non-logo region of the image by detecting a logo estimate region of the image, determining a logo surrounding region of the image that surrounds the logo estimate region of the image, analyzing a histogram of the logo surrounding region of the image to detect background maximum luminance of the logo surrounding region of the image, determining high-gray-scale maximum luminance of the logo estimate region of the image based on the background maximum luminance of the logo surrounding region of the image, and adjusting a gamma curve of the logo estimate region of the image based on the high-gray-scale maximum luminance of the logo estimate region of the image. Thus, the method can efficiently reduce the luminance of the logo region of the image without the need for accurately detecting the logo region of the image.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF CERTAIN INVENTIVE EMBODIMENTS

To alleviate or prevent permanent afterimages from forming, the standard display device detects an average luminance of a logo surrounding region of a displayed image, determines or sets a target luminance of the logo region of the image to be close to the average luminance of the logo surrounding region of the image, and intentionally reduces the luminance of the logo region of the image to be substantially the same as the target luminance of the logo region of the image. Here, the standard display device is required to accurately detect the logo region of the image. That is, since the standard display device is required to employ a processing intensive region-detection algorithm to accurately detect the logo region of the image, the standard display device requires time and computing resources to detect the logo region of the image.

Hereinafter, the described technology will be explained in detail with reference to the accompanying drawings.

Figure 1:
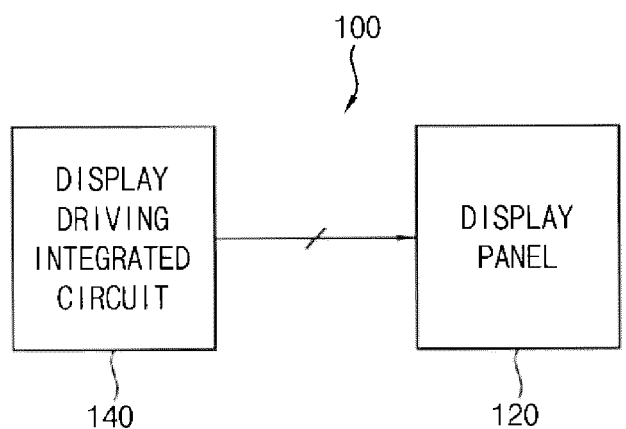
FIG. 1 is a block diagram illustrating a display device according to example embodiments.
Figure 2:
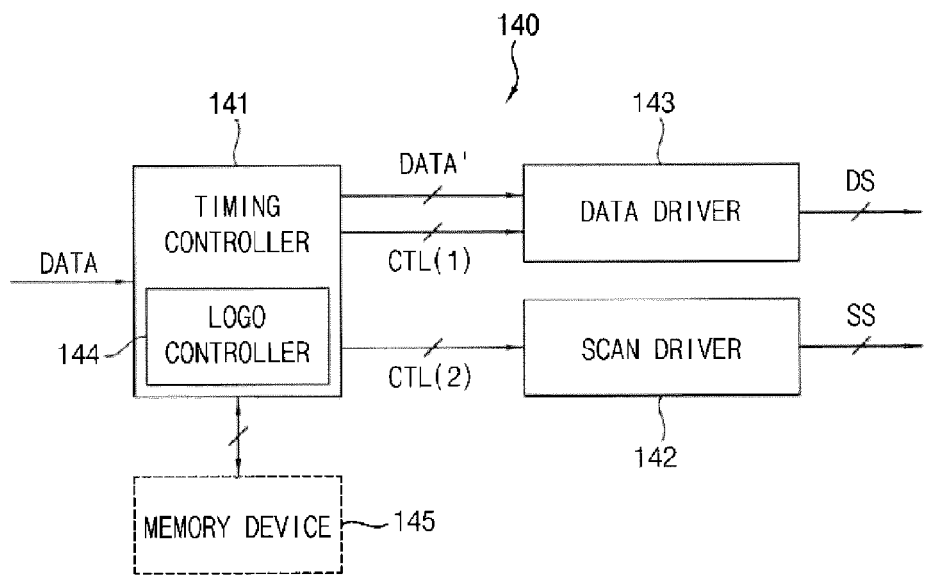
FIG. 2 is a block diagram illustrating an example of a display driving integrated circuit included in the display device of FIG. 1.
Figure 3:
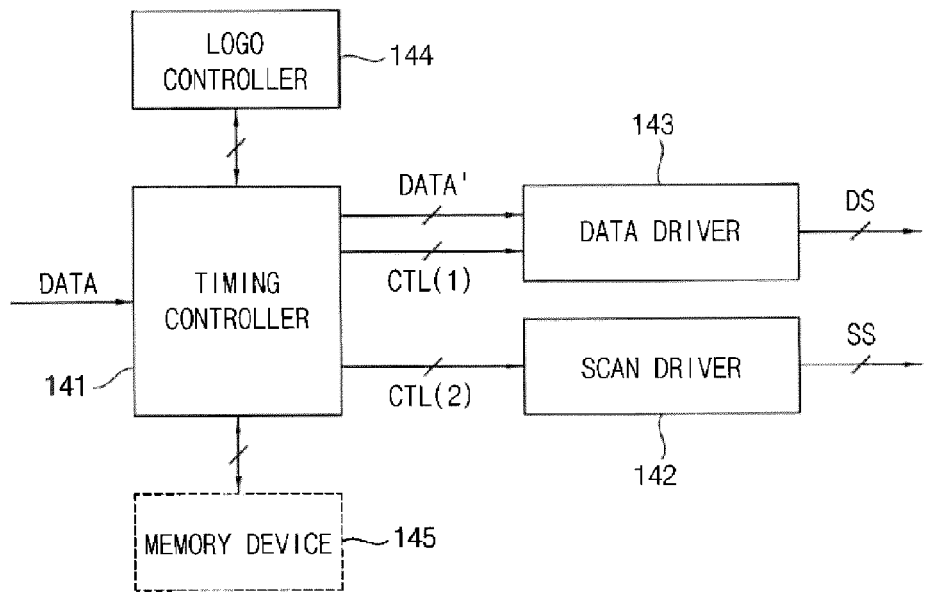
FIG. 3 is a block diagram illustrating another example of a display driving integrated circuit included in the display device of FIG. 1.
Figure 4:
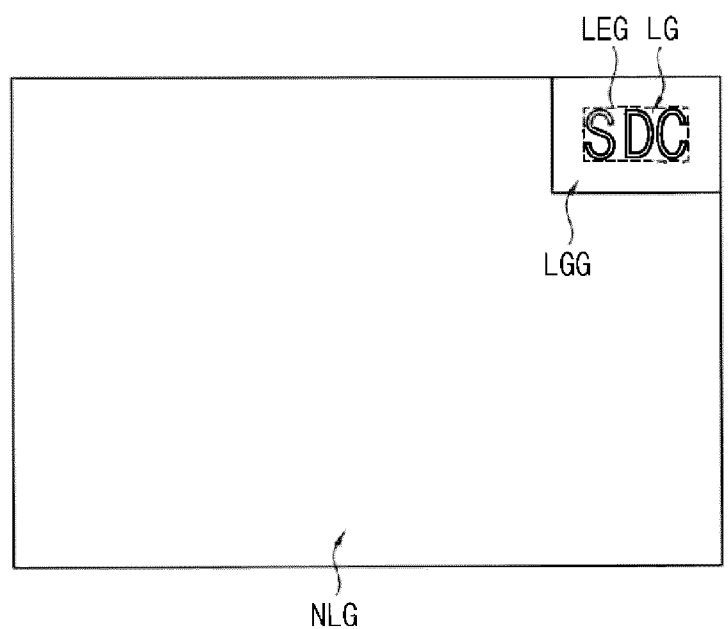
FIG. 4 is a diagram illustrating an image that is displayed on a display panel included in the display device of FIG. 1.

FIG. 1 is a block diagram illustrating a display device according to example embodiments. FIG. 2 is a block diagram illustrating an example of a display driving integrated circuit included in the display device of FIG. 1. FIG. 3 is a block diagram illustrating another example of a display driving integrated circuit included in the display device of FIG. 1. FIG. 4 is a diagram illustrating an image that is displayed on a display panel included in the display device of FIG. 1.

Depending on embodiments, certain elements may be removed from or additional elements may be added to the display device 100 illustrated in FIG. 1. Furthermore, two or more elements may be combined into a single element, or a single element may be realized as multiple elements. This applies to the remaining apparatus embodiments.

Referring to FIGS. 1 through 4, the display device 100 includes a display panel 120 that displays an image and a display driving integrated circuit 140 that drives the display panel 120. In addition, as illustrated in FIGS. 2 and 3, the display driving integrated circuit 140 can include a timing controller 141, a scan driver 142, a data driver 143, and a logo controller 144. Furthermore, the display driving integrated circuit 140 can include a memory device or memory 145. For example, the display device 100 can be a liquid crystal display (LCD) or an organic light-emitting diode (OLED) display. However, the display device 100 is not limited thereto. In some example embodiments, the display device 100 further includes other components.

The display panel 120 includes a plurality of pixels. The display panel 120 is connected to the scan driver 142 of the display driving integrated circuit 140 via first through (n)th scan-lines, where n is an integer greater than or equal to 2. The display panel 120 is connected to the data driver 143 of the display driving integrated circuit 140 via first through (m)th data-lines, where m is an integer greater than or equal to 2. Here, since the pixels are arranged at locations corresponding to the intersections between the first through (n)th scan-lines and the first through (m)th data-lines, the display panel 120 can include n×m pixels.

In example embodiments, as illustrated in FIG. 4, an image including a logo region LG can be displayed on the display panel 120. Generally, the logo region LG of the image is continuously displayed at a specific location for a long time. For example, the logo region LG of the image can include a subtitle, a character string, a figure, etc. As another example, the logo region LG of the image can indicate the source of the image (e.g., CNN, KBS, MBC, etc.). Due to the nature of the logo region LG of the image, the logo region LG of the image is required to overwhelm the non-logo region LGG and NLG of the image to be effectively observed or perceived by a viewer. Thus, the logo region LG of the image has a relatively high gray-scale (i.e., a relatively high luminance) compared to the non-logo region LGG and NLG of the image. Consequently, the logo region LG of the image can cause pixel degradation faster than the non-logo region LGG and NLG of the image. As a result, a difference between the pixel degradation due to the logo region LG of the image and the pixel degradation due to the non-logo region LGG and NLG of the image can increase as the display device 100 operates. Thus, a permanent afterimage due to a luminance difference or a color difference between the logo region LG of the image and the non-logo region LGG and NLG of the image can be observed by the viewer as the display device 100 operates.

To alleviate or prevent the permanent afterimage, the standard display device detects an average luminance of the logo surrounding region LGG of the image, determines or sets a target luminance of the logo region LG of the image to be close to the average luminance of the logo surrounding region LGG of the image and intentionally reduces the luminance of the logo region LG of the image to be substantially the same as the target luminance of the logo region LG of the image. Here, the standard display device is required to accurately detect the logo region LG of the image. Accordingly, the standard display device is required to employ a complicate region-detection algorithm to accurately detect the logo region LG of the image, and thus, the standard display device requires a certain amount of time and resources to detect the logo region LG of the image.

To overcome this problem, the display device 100 can use a logo estimate region LEG of the image rather than the logo region LG of the image when the display device 100 reduces the luminance of the logo region LG of the image. In other words, the display device 100 can slow or alleviate the degradation of pixels located in the logo region LG of the image by adjusting a gamma curve of the logo estimate region LEG of the image to reduce the luminance of the logo region LG of the image. As a result, the complicate region-detection algorithm is not required for the display device 100 (i.e., is not employed by the display device 100), so that the display device 100 can accurately reduce the luminance of the logo region LG of the image at high speeds.

The display driving integrated circuit 140 can drive the display panel 120. In addition, as described above, the display driving integrated circuit 140 can adjust the gamma curve of the logo estimate region LEG of the image. Specifically, the display driving integrated circuit 140 can detect the logo estimate region LEG of the image that surrounds the logo region LG of the image and determine the logo surrounding region LGG of the image that surrounds the logo estimate region LEG of the image. The display driving integrated circuit 140 can also analyze the histogram of the logo surrounding region LGG of the image to detect the background maximum luminance of the logo surrounding region LGG of the image, determine the high-gray-scale maximum luminance of the logo estimate region LEG of the image based on the background maximum luminance of the logo surrounding region LGG of the image, and adjust the gamma curve of the logo estimate region LEG of the image to control luminance of an entire gray-scale range of the gamma curve of the logo estimate region LEG of the image to be less than the high-gray-scale maximum luminance of the logo estimate region LEG of the image.

In the logo estimate region LEG of the image, the logo region LG of the image can have a gray-scale that is greater than that of a region other than the logo region LG of the image. That is, in the logo estimate region LEG of the image, the logo region LG of the image can have a relatively high gray-scale (i.e., relatively high luminance) and the region other than the logo region LG of the image can have a relatively low gray-scale (i.e., relatively low luminance). Thus, when the display device 100 uses the logo estimate region LEG of the image rather than the logo region LG of the image to reduce the luminance of the logo region LG of the image, the display device 100 can adjust only the luminance of the logo region LG of the image by adjusting the gamma curve of the logo estimate region LEG of the image in a high gray-scale range without adjusting the luminance in a low gray-scale range (i.e., by reducing only the high-gray-scale maximum luminance of the logo estimate region LEG of the image). In example embodiments, the logo estimate region LEG of the image has a height that is greater than or equal to a maximum height of the logo region LG of the image and a width that is greater than or equal to a maximum width of the logo region LG of the image. Thus, the display driving integrated circuit 140 can detect or determine the logo estimate region LEG of the image that surrounds the logo region LG of the image.

In an example embodiment, when the logo surrounding region LGG of the image has a single color, the display driving integrated circuit 140 can determine the background maximum luminance of the logo surrounding region LGG of the image to be the maximum luminance of the single color of the logo surrounding region LGG of the image when the display driving integrated circuit 140 detects the background maximum luminance of the logo surrounding region LGG of the image by analyzing the histogram of the logo surrounding region LGG of the image. However, the background maximum luminance of the logo surrounding region LGG of the image is not limited thereto. For example, according to requirements for the display device 100, the display driving integrated circuit 140 can determine the background maximum luminance of the logo surrounding region LGG of the image by adding a predetermined value to the maximum luminance of the single color of the logo surrounding region LGG of the image or by subtracting a predetermined value from the maximum luminance of the single color of the logo surrounding region LGG of the image.

In another example embodiment, when the logo surrounding region LGG of the image has multiple colors, the display driving integrated circuit 140 can determine the background maximum luminance of the logo surrounding region LGG of the image to be the highest luminance among maximum luminance of a red color, maximum luminance of a green color, and maximum luminance of a blue color of the logo surrounding region LGG of the image when the display driving integrated circuit 140 detects the background maximum luminance of the logo surrounding region LGG of the image by analyzing the histogram of the logo surrounding region LGG of the image. However, the background maximum luminance of the logo surrounding region LGG of the image is not limited thereto. For example, in some embodiments, the display driving integrated circuit 140 can determine the background maximum luminance of the logo surrounding region LGG of the image by adding a predetermined value to the highest luminance among the maximum luminance of the red color, the maximum luminance of the green color, and the maximum luminance of the blue color of the logo surrounding region LGG of the image or by subtracting a predetermined value from the highest luminance among the maximum luminance of the red color, the maximum luminance of the green color, and the maximum luminance of the blue color of the logo surrounding region LGG of the image.

In example embodiments, the display driving integrated circuit 140 can determine the high-gray-scale maximum luminance of the logo estimate region LEG of the image within a predetermined range with respect to the background maximum luminance of the logo surrounding region LGG of the image. As described above, the display driving integrated circuit 140 can adjust the gamma curve of the logo estimate region LEG of the image to control luminance of an entire gray-scale range of the gamma curve of the logo estimate region LEG of the image to be less than the high-gray-scale maximum luminance of the logo estimate region LEG of the image. Thus, the display driving integrated circuit 140 can determine the high-gray-scale maximum luminance of the logo estimate region LEG of the image near the background maximum luminance of the logo surrounding region LGG of the image. It can be desirable for the display driving integrated circuit 140 to determine the high-gray-scale maximum luminance of the logo estimate region LEG of the image by adding a predetermined value to the background maximum luminance of the logo surrounding region LGG of the image.

As described above, the display device 100 can use the logo estimate region LEG of the image rather than the logo region LG of the image when the display device 100 reduces the luminance of the logo region LG of the image. Here, the display device 100 can reduce the luminance of the logo region LG of the image by adjusting the gamma curve of the logo estimate region LEG of the image. In the logo estimate region LEG of the image, since the logo region LG of the image has a relatively high gray-scale (i.e., relatively high luminance) and the region other than the logo region LG of the image has a relatively low gray-scale (i.e., relatively low luminance), the display driving integrated circuit 140 can adjust only the luminance of the logo region LG of the image by reducing only luminance of a high-gray-scale range that is greater than a predetermined gray-scale on the gamma curve of the logo estimate region LEG of the image. That is, the display driving integrated circuit 140 may not adjust luminance of a low-gray-scale range that is lower than the predetermined gray-scale on the gamma curve of the logo estimate region LEG of the image. Thus, image distortion of the logo estimate region LEG of the image can be minimized or reduced.

In some example embodiments, the display driving integrated circuit 140 can increase the luminance of the low-gray-scale range that is less than the predetermined gray-scale on the gamma curve of the logo estimate region LEG of the image in order to reduce a gray-scale difference between the logo region LG of the image and the region other than the logo region LG of the image in the logo estimate region LEG of the image. Additionally, when the display driving integrated circuit 140 adjusts the gamma curve of the logo estimate region LEG of the image, a gray-scale discontinuity between the logo estimate region LEG of the image and the logo surrounding region LGG of the image may occur. Thus, in some example embodiments, the display driving integrated circuit 140 can adjust a gamma curve of the logo surrounding region LGG of the image as well as the gamma curve of the logo estimate region LEG of the image.

In this embodiment, the gamma curve of the logo surrounding region LGG of the image can be adjusted based on high-gray-scale maximum luminance of the logo surrounding region LGG of the image. For example, the display driving integrated circuit 140 can set or determine the high-gray-scale maximum luminance of the logo surrounding region LGG of the image to be greater than the high-gray-scale maximum luminance of the logo estimate region LEG of the image. Here, in order to prevent a gray-scale discontinuity between the logo estimate region LEG of the image and the logo surrounding region LGG of the image, the display driving integrated circuit 140 can increase the high-gray-scale maximum luminance of the logo surrounding region LGG of the image as the distance from the logo estimate region LEG of the image increases. That is, the display driving integrated circuit 140 can gradually reduce an amount of adjustment of the gamma curve of the logo surrounding region LGG of the image as the distance from the logo estimate region LEG of the image increases.

When the size or area of the logo estimate region LEG of the image is relatively large, the visibility of the image distortion can increase as the gamma curve of the logo estimate region LEG of the image is adjusted. Thus, under substantially the same conditions, the display driving integrated circuit 140 can selectively adjust the high-gray-scale maximum luminance of the logo estimate region LEG of the image based on the size of the logo estimate region LEG of the image. Specifically, the display driving integrated circuit 140 can increase the high-gray-scale maximum luminance of the logo estimate region LEG of the image as the size of the logo estimate region LEG of the image increases.

That is, since the visibility of the image distortion increases as the size of the logo estimate region LEG of the image increases, the display driving integrated circuit 140 can increase the high-gray-scale maximum luminance of the logo estimate region LEG of the image to reduce an amount of adjustment of the gamma curve of the logo estimate region LEG of the image. In addition, the display driving integrated circuit 140 may not adjust the high-gray-scale maximum luminance of the logo estimate region LEG of the image when the size of the logo estimate region LEG of the image is less than a predetermined low-limit size. That is, since the visibility of the image distortion is relatively low when the size of the logo estimate region LEG of the image is less than the predetermined low-limit size, the display driving integrated circuit 140 may not reduce an amount of adjustment of the gamma curve of the logo estimate region LEG of the image.

Furthermore, the display driving integrated circuit 140 can set the high-gray-scale maximum luminance of the logo estimate region LEG of the image to be a maximum value supported by the display panel 120 when the size of the logo estimate region LEG of the image is greater than a predetermined high-limit size. That is, since the visibility of the image distortion is relatively high when the size of the logo estimate region LEG of the image is greater than the predetermined high-limit size, the display driving integrated circuit 140 can set the high-gray-scale maximum luminance of the logo estimate region LEG of the image to be the maximum value in order not to adjust the gamma curve of the logo estimate region LEG of the image.

As described above, the display driving integrated circuit 140 can include the timing controller 141, the scan driver 142, the data driver 143, and the logo controller 144. The scan driver 142 provides scan signals SS to the display panel 120 via the scan-lines. The data driver 143 provides data signals DS to the display panel 120 via the data-lines. The logo controller 144 can perform the above-described operations for adjusting the gamma curve of the logo estimate region LEG of the image.

That is, the logo controller 144 can generate compensated image data DATA' by adjusting the gamma curve of the logo estimate region LEG of the image on image data DATA received from an external source. The timing controller 141 can generate control signals CTL(1) and CTL(2) and respectively provide the control signals CTL(1) and CTL(2) to the data driver 143 and the scan driver 142. That is, the timing controller 141 can control the data driver 143 and the scan driver 142. In addition, the timing controller 141 can control the logo controller 144. Here, the timing controller 141 can interact with the logo controller 141 to change the image data DATA to the compensated image data DATA'.

In an example embodiment, as illustrated in FIG. 2, the logo controller 144 is located inside the timing controller

141. In another example embodiment, as illustrated in FIG. 3, the logo controller 144 is located outside of the timing controller 141. That is, the logo controller 144 can be implemented separately from the timing controller 141. In some example embodiments, the display driving integrated circuit 140 can further include the memory device 145 (e.g., a flash memory device, an electrically erasable programmable read-only memory (EEPROM) device, etc.) that stores data required to adjust the gamma curve of the logo estimate region LEG of the image.

In brief, the display device 100 can alleviate or reduce a permanent afterimage due to a luminance difference or a color difference between the logo region LG of the image and the non-logo region NLG and LGG of the image by detecting the logo estimate region LEG of the image, determining the logo surrounding region LGG of the image that surrounds the logo estimate region LEG of the image, analyzing the histogram of the logo surrounding region LGG of the image to detect the background maximum luminance of the logo surrounding region LGG of the image, determining the high-gray-scale maximum luminance of the logo estimate region LEG of the image based on the background maximum luminance of the logo surrounding region LGG of the image, and adjusting the gamma curve of the logo estimate region LEG of the image based on the high-gray-scale maximum luminance of the logo estimate region LEG of the image. Thus, the display device 100 can efficiently reduce the luminance of the logo region LG of the image without the need for accurately detecting the logo region LG of the image.

Figure 5:
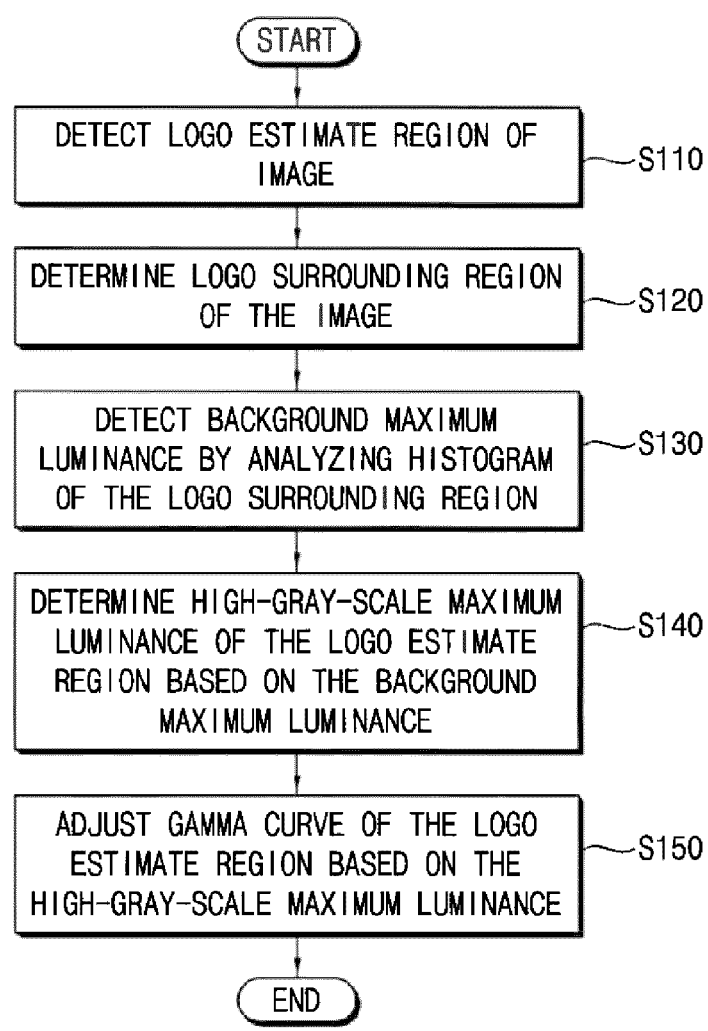
FIG. 5 is a flowchart illustrating a method of adjusting luminance of a logo region of an image for a display device according to example embodiments.
Figure 6:
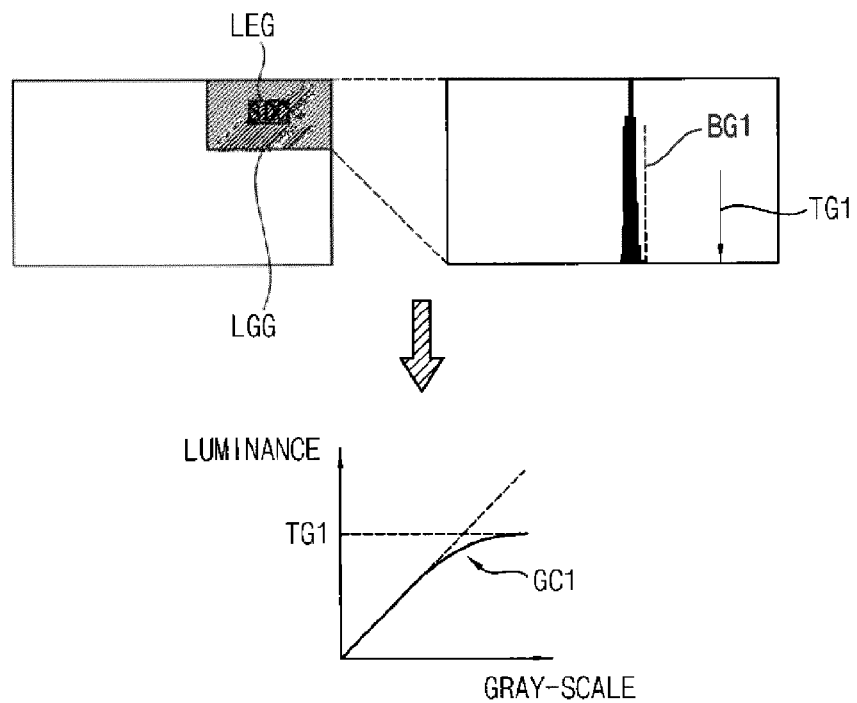
FIG. 6 is a diagram illustrating an example in which a gamma curve of a logo estimate region of an image is adjusted by the method of FIG. 5.
Figure 7:
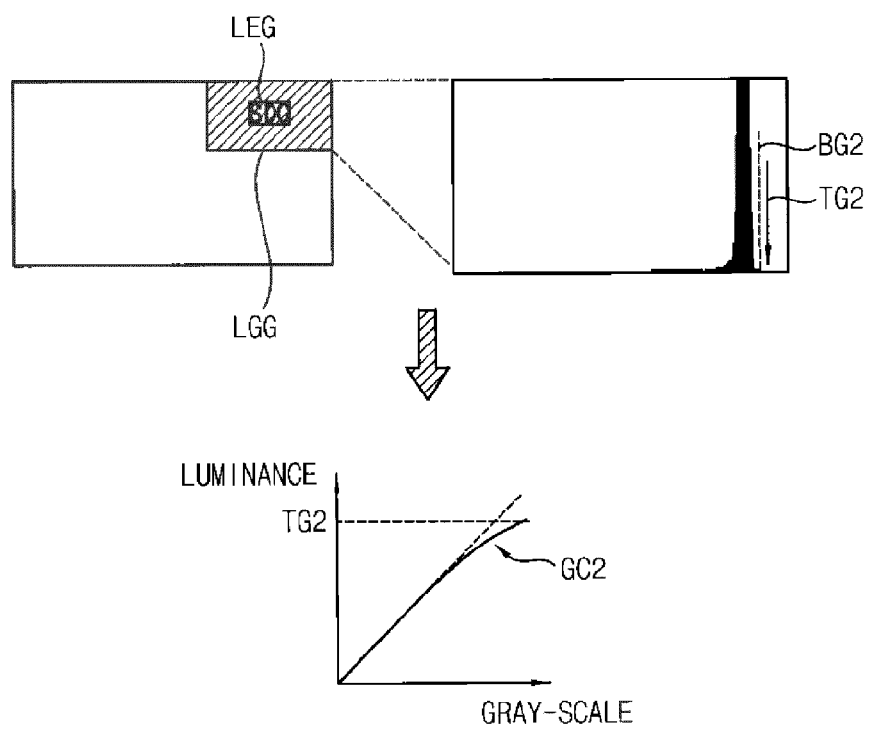
FIG. 7 is a diagram illustrating another example in which a gamma curve of a logo estimate region of an image is adjusted by the method of FIG. 5.

FIG. 5 is a flowchart illustrating a method of adjusting luminance of a logo region of an image for a display device according to example embodiments. FIG. 6 is a diagram illustrating an example in which a gamma curve of a logo estimate region of an image is adjusted by the method of FIG. 5. FIG. 7 is a diagram illustrating another example in which a gamma curve of a logo estimate region of an image is adjusted by the method of FIG. 5.

Depending on embodiments, additional states may be added, others removed, or the order of the states changed in the method of FIG. 5. This applies to the remaining method embodiments.

Referring to FIGS. 5 through 7, the method of FIG. 5 can adjust the luminance of a logo region of an image displayed on a display panel. Specifically, the method of FIG. 5 can detect a logo estimate region LEG of the image that surrounds the logo region of the image (S110) and determine a logo surrounding region LGG of the image that surrounds the logo estimate region LEG of the image (S120). The method can also detect a background maximum luminance (i.e., indicated as BG1 and BG2) of the logo surrounding region LGG of the image by analyzing a histogram of the logo surrounding region LGG of the image (S130) and determine a high-gray-scale maximum luminance (i.e., indicated as TG1 and TG2) of the logo estimate region LEG of the image based on the background maximum luminance (i.e., indicated as BG1 and BG2) of the logo surrounding region LGG of the image (S140).

Subsequently, the method of FIG. 5 can adjust a gamma curve (i.e., indicated as GC1 and GC2) of the logo estimate region LEG of the image (S150) to control the luminance of an entire gray-scale range of the gamma curve (i.e., indicated as GC1 and GC2) of the logo estimate region LEG of the image to be less than the high-gray-scale maximum luminance (i.e., indicated as TG1 and TG2) of the logo estimate region LEG of the image. That is, the method of FIG. 5 can use the logo estimate region LEG of the image rather than the logo region of the image when the method of FIG. 5 reduces the luminance of the logo region of the image. In example embodiments, the logo estimate region LEG of the image can have a height that is greater than or equal to a maximum height of the logo region of the image and a width that is greater than or equal to a maximum width of the logo region of the image.

As illustrated in FIG. 6, when the logo surrounding region LGG of the image is relatively dark, an analysis on the histogram of the logo surrounding region LGG of the image can be performed to determine whether the background maximum luminance (i.e., indicated as BG1) of the logo surrounding region LGG of the image is relatively low. That is, when the high-gray-scale maximum luminance (i.e., indicated as TG1) of the logo estimate region LEG of the image is determined to be near the background maximum luminance (i.e., indicated as BG1) of the logo surrounding region LGG of the image, the high-gray-scale maximum luminance (i.e., indicated as TG1) of the logo estimate region LEG of the image may be relatively low. Here, the method of FIG. 5 can set the high-gray-scale maximum luminance (i.e., indicated as TG1) of the logo estimate region LEG of the image to be greater than the background maximum luminance (i.e., indicated as BG1) of the logo surrounding region LGG of the image.

In some example embodiments, the method of FIG. 5 can set the high-gray-scale maximum luminance (i.e., indicated as TG1) of the logo estimate region LEG of the image to be less than the background maximum luminance (i.e., indicated as BG1) of the logo surrounding region LGG of the image as long as the image distortion of the logo estimate region LEG of the image is substantially invisible. That is, the method of FIG. 5 can determine the high-gray-scale maximum luminance (i.e., indicated as TG1) of the logo estimate region LEG of the image within a predetermined range with respect to the background maximum luminance (i.e., indicated as BG1) of the logo surrounding region LGG of the image.

Next, the method of FIG. 5 can adjust the gamma curve (i.e., indicated as GC1) of the logo estimate region LEG of the image to control the luminance of the entire gray-scale range of the gamma curve (i.e., indicated as GC1) of the logo estimate region LEG of the image to be less than the high-gray-scale maximum luminance (i.e., indicated as TG1) of the logo estimate region LEG of the image. As a result, the luminance of the high-gray-scale range of the gamma curve (i.e., indicated as GC1) of the logo estimate region LEG of the image can be reduced. In addition, since the high-gray-scale range of the gamma curve (i.e., indicated as GC1) of the logo estimate region LEG of the image corresponds to the logo region of the image, only the luminance of the logo region of the image may be substantially reduced.

As illustrated in FIG. 7, when the logo surrounding region LGG of the image is relatively bright, an analysis on the histogram of the logo surrounding region LGG of the image can be performed to determine whether the background maximum luminance (i.e., indicated as BG2) of the logo surrounding region LGG of the image is relatively high. That is, when the high-gray-scale maximum luminance (i.e., indicated as TG2) of the logo estimate region LEG of the image is determined near the background maximum luminance (i.e., indicated as BG2) of the logo surrounding region LGG of the image, the high-gray-scale maximum luminance (i.e., indicated as TG2) of the logo estimate region LEG of the image can be relatively high. Here, the method of FIG. 5 can set the high-gray-scale maximum luminance (i.e., indicated as TG2) of the logo estimate region LEG of the image to be greater than the background maximum luminance (i.e., indicated as BG2) of the logo surrounding region LGG of the image.

In some example embodiments, the method of FIG. 5 can set the high-gray-scale maximum luminance (i.e., indicated as TG2) of the logo estimate region LEG of the image to be less than the background maximum luminance (i.e., indicated as BG2) of the logo surrounding region LGG of the image as long as the image distortion of the logo estimate region LEG of the image is substantially invisible. That is, the method of FIG. 5 can determine the high-gray-scale maximum luminance (i.e., indicated as TG2) of the logo estimate region LEG of the image within a predetermined range with respect to the background maximum luminance (i.e., indicated as BG2) of the logo surrounding region LGG of the image.

Next, the method of FIG. 5 can adjust the gamma curve (i.e., indicated as GC2) of the logo estimate region LEG of the image to control the luminance of the entire gray-scale range of the gamma curve (i.e., indicated as GC2) of the logo estimate region LEG of the image to be less than the high-gray-scale maximum luminance (i.e., indicated as TG2) of the logo estimate region LEG of the image. As a result, the luminance of the high-gray-scale range of the gamma curve (i.e., indicated as GC2) of the logo estimate region LEG of the image can be reduced. In addition, since the high-gray-scale range of the gamma curve (i.e., indicated as GC2) of the logo estimate region LEG of the image corresponds to the logo region of the image, only the luminance of the logo region of the image may be substantially reduced.

In brief, the method of FIG. 5 can alleviate or reduce a permanent afterimage due to a luminance difference or a color difference between the logo region of the image and the non-logo region of the image by detecting the logo estimate region LEG of the image, determining the logo surrounding region LGG of the image that surrounds the logo estimate region LEG of the image, analyzing the histogram of the logo surrounding region LGG of the image to detect the background maximum luminance (i.e., indicated as BG1 and BG2) of the logo surrounding region LGG of the image, determining the high-gray-scale maximum luminance (i.e., indicated as TG1 and TG2) of the logo estimate region LEG of the image based on the background maximum luminance (i.e., indicated as BG1 and BG2) of the logo surrounding region LGG of the image, and adjusting the gamma curve (i.e., indicated as GC1 and GC2) of the logo estimate region LEG of the image based on the high-gray-scale maximum luminance (i.e., indicated as TG1 and TG2) of the logo estimate region LEG of the image. Thus, the method of FIG. 5 can efficiently reduce the luminance of the logo region of the image without the need for accurately detecting the logo region of the image.

Figure 8:
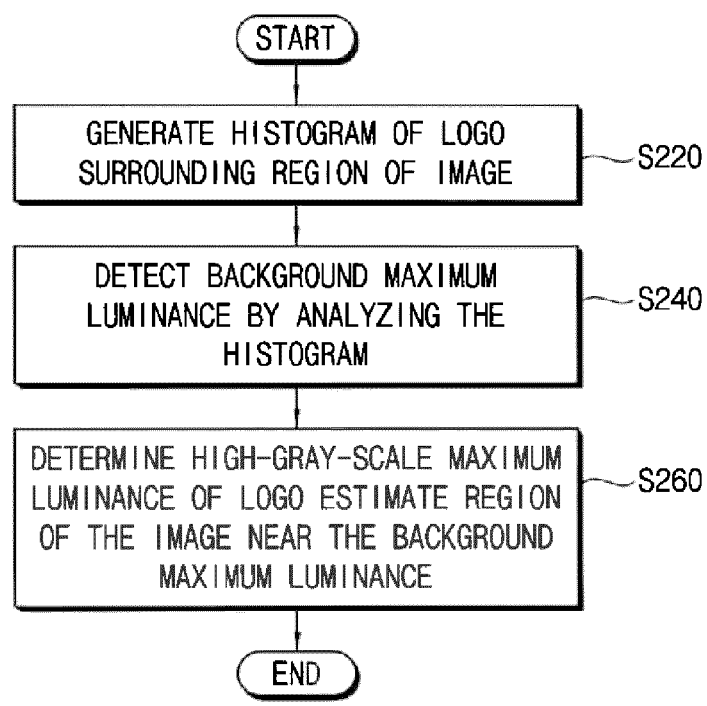
FIG. 8 is a flowchart illustrating a process in which a gamma curve of a logo estimate region of an image is adjusted by the method of FIG. 5 when a logo surrounding region of the image has a single color.
Figure 9:
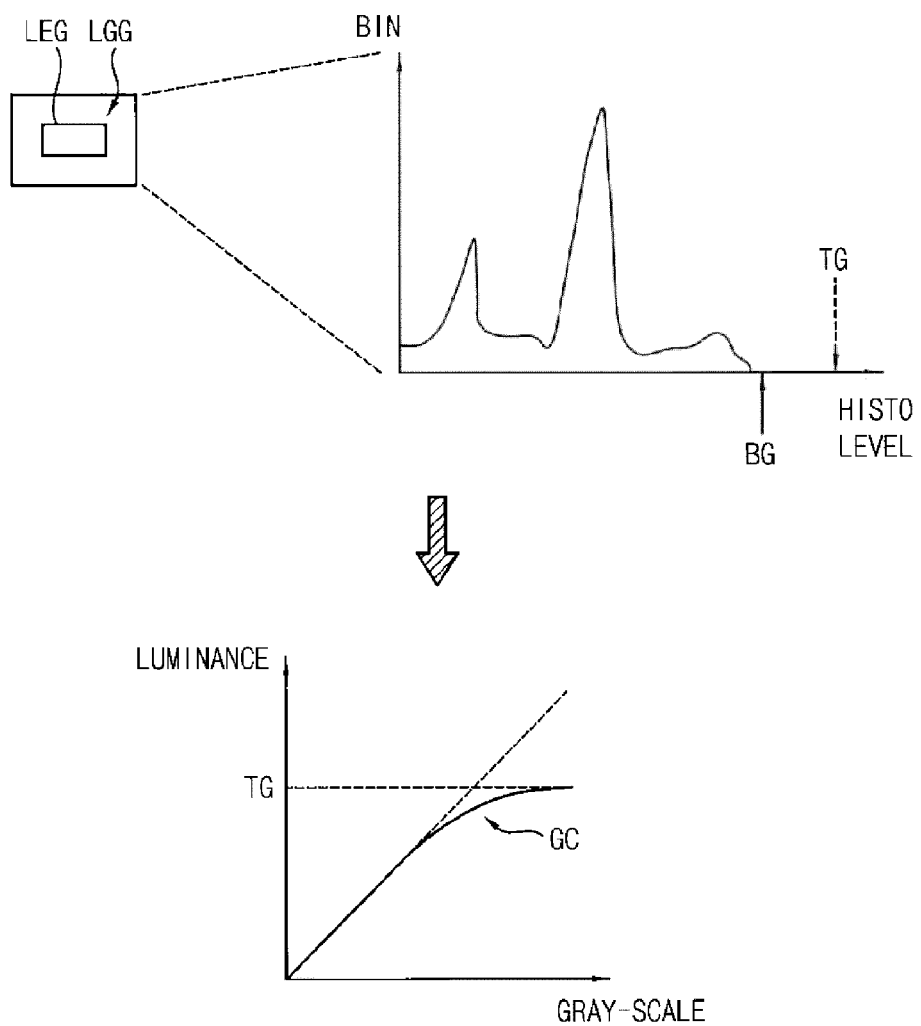
FIG. 9 is a diagram for describing a process in which a gamma curve of a logo estimate region of an image is adjusted by the method of FIG. 5 when a logo surrounding region of the image has a single color.

FIG. 8 is a flowchart illustrating a process in which a gamma curve of a logo estimate region of an image is adjusted by the method of FIG. 5 when a logo surrounding region of the image has a single color. FIG. 9 is a diagram for describing a process in which a gamma curve of a logo estimate region of an image is adjusted by the method of FIG. 5 when a logo surrounding region of the image has a single color.

Referring to FIGS. 8 and 9, when the logo surrounding region LGG of the image has a single color, the method of FIG. 5 can determine the background maximum luminance (i.e., indicated as BG) of the logo surrounding region LGG of the image to be a maximum luminance of the single color of the logo surrounding region LGG of the image and adjust the gamma curve (i.e., indicated as GC) of the logo estimate region LEG of the image based on the high-gray-scale maximum luminance (i.e., indicated as TG) of the logo estimate region LEG of the image that is determined based on the background maximum luminance (i.e., indicated as BG) of the logo surrounding region LGG of the image.

Specifically, the method of FIG. 5 can generate a histogram of the logo surrounding region LGG of the image (S220). As illustrated in FIG. 9, the X-axis of the histogram can indicate a histogram level HISTO LEVEL and the Y-axis of the histogram can indicate the number of bins BIN at each histogram level. Subsequently, the method of FIG. 5 can detect the background maximum luminance (i.e., indicated as BG) of the logo surrounding region LGG of the image (S240) by analyzing the histogram of the logo surrounding region LGG of the image. Here, since the logo surrounding region LGG of the image has the single color, the method of FIG. 5 can determine the background maximum luminance (i.e., indicated as BG) of the logo surrounding region LGG of the image to be the maximum luminance of the single color of the logo surrounding region LGG of the image.

Next, the method of FIG. 5 can determine the high-gray-scale maximum luminance (i.e., indicated as TG) of the logo estimate region LEG of the image near the background maximum luminance (i.e., indicated as BG) of the logo surrounding region LGG of the image (S260). In some example embodiments, the high-gray-scale maximum luminance (i.e., indicated as TG) of the logo estimate region LEG of the image can be set or determined to be greater than the background maximum luminance (i.e., indicated as BG) of the logo surrounding region LGG of the image. In some example embodiments, the high-gray-scale maximum luminance (i.e., indicated as TG) of the logo estimate region LEG of the image can be set or determined to be less than the background maximum luminance (i.e., indicated as BG) of the logo surrounding region LGG of the image as long as the image distortion of the logo estimate region LEG of the image is substantially invisible. Next, the method of FIG. 5 can adjust the gamma curve (i.e., indicated as GC) of the logo estimate region LEG of the image to control the luminance of the entire gray-scale range of the gamma curve (i.e., indicated as GC) of the logo estimate region LEG of the image to be less than the high-gray-scale maximum luminance (i.e., indicated as TG) of the logo estimate region LEG of the image.

Figure 10:
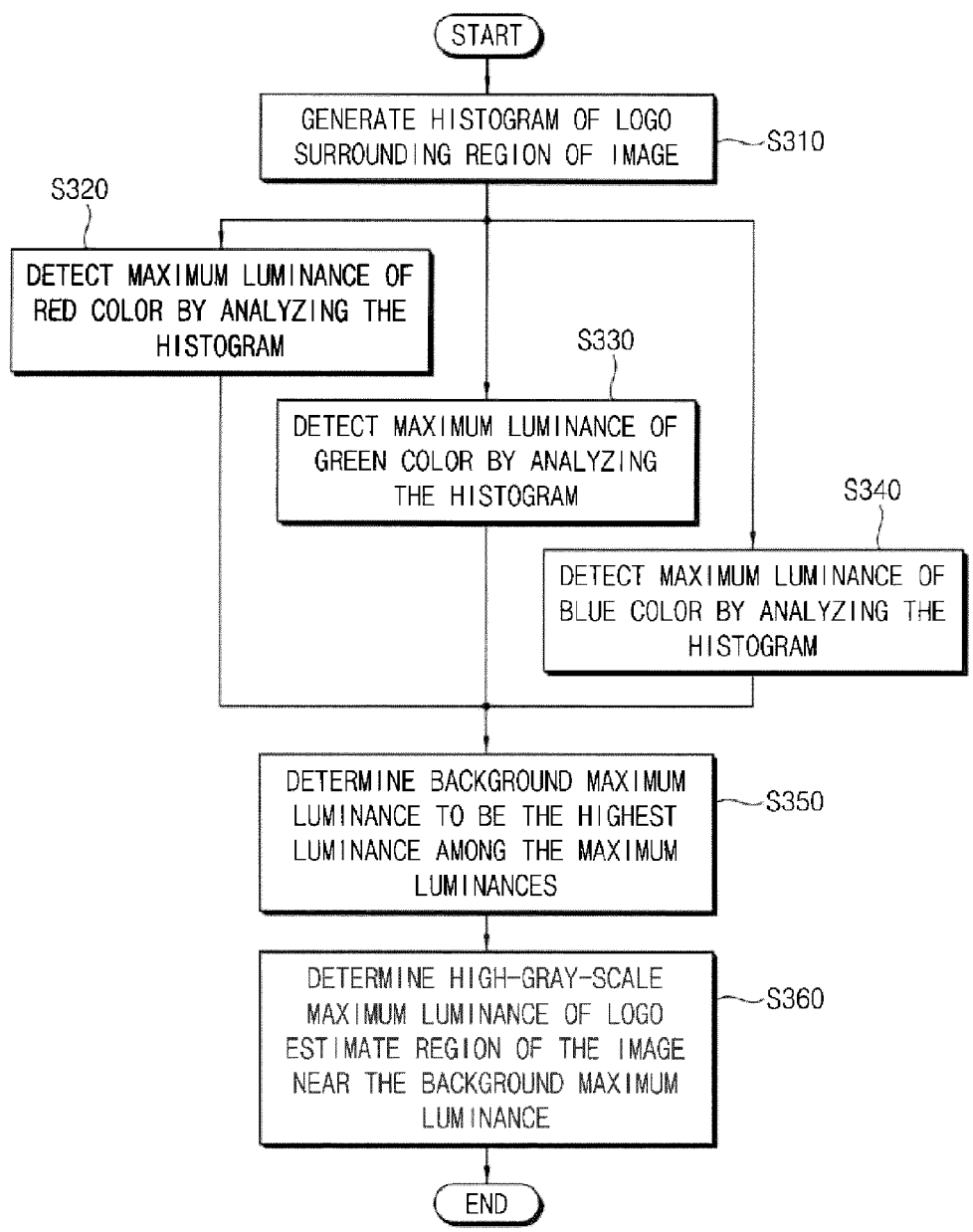
FIG. 10 is a flowchart illustrating a process in which a gamma curve of a logo estimate region of an image is adjusted by the method of FIG. 5 when a logo surrounding region of the image has multiple colors.
Figure 11:
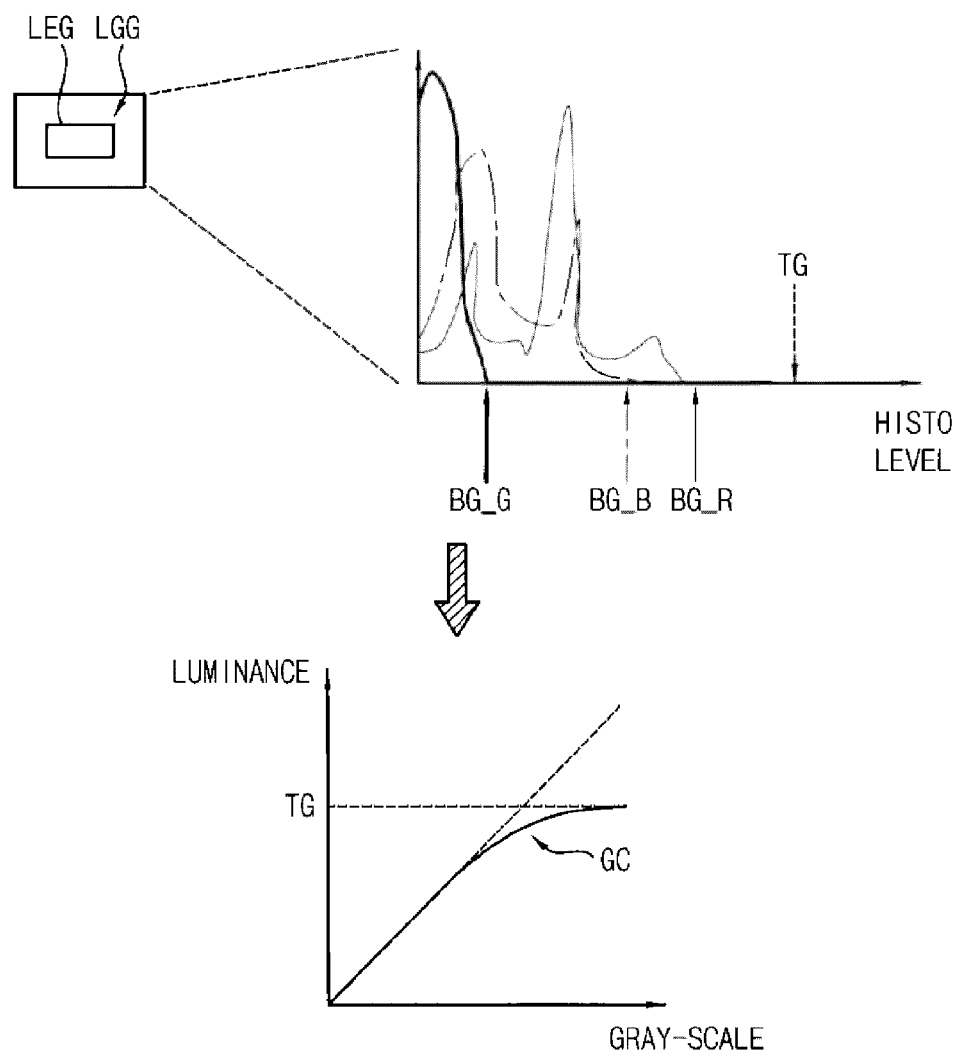
FIG. 11 is a diagram for describing a process in which a gamma curve of a logo estimate region of an image is adjusted by the method of FIG. 5 when a logo surrounding region of the image has multiple colors.

FIG. 10 is a flowchart illustrating a process in which a gamma curve of a logo estimate region of an image is adjusted by the method of FIG. 5 when a logo surrounding region of the image has multiple colors. FIG. 11 is a diagram for describing a process in which a gamma curve of a logo estimate region of an image is adjusted by the method of FIG. 5 when a logo surrounding region of the image has multiple colors.

Referring to FIGS. 10 and 11, when the logo surrounding region LGG of the image has multiple colors, the method of FIG. 5 can determine the background maximum luminance (i.e., indicated as BG) of the logo surrounding region LGG of the image to be the highest luminance among the maximum luminance of a red color (i.e., indicated as BG_R), the maximum luminance of a green color (i.e., indicated as BG_G), and the maximum luminance of a blue color (i.e., indicated as BG_B) of the logo surrounding region LGG of the image. The method can further adjust the gamma curve (i.e., indicated as GC) of the logo estimate region LEG of the image based on the high-gray-scale maximum luminance (i.e., indicated as TG) of the logo estimate region LEG of the image that is determined based on the background maximum luminance (i.e., indicated as BG) of the logo surrounding region LGG of the image.

Specifically, the method of FIG. 5 can generate a histogram of the logo surrounding region LGG of the image (S310). As illustrated in FIG. 11, the X-axis of the histogram can indicate a histogram level HISTO LEVEL and the Y-axis of the histogram can indicate the number of bins BIN at each histogram level. Subsequently, the method of FIG. 5 can detect the maximum luminance of the red color (i.e., indicated as BG_R) of the logo surrounding region LGG of the image (S320) by analyzing the histogram of the logo surrounding region LGG of the image, detect the maximum luminance of the green color (i.e., indicated as BG_G) of the logo surrounding region LGG of the image (S330) by analyzing the histogram of the logo surrounding region LGG of the image, and detect the maximum luminance of the blue color (i.e., indicated as BG_B) of the logo surrounding region LGG of the image (S340) by analyzing the histogram of the logo surrounding region LGG of the image.

Next, the method of FIG. 5 can determine the background maximum luminance (i.e., indicated as BG) of the logo surrounding region LGG of the image to be the highest luminance among the maximum luminance of the red color (i.e., indicated as BG_R), the maximum luminance of the green color (i.e., indicated as BG_G), and the maximum luminance of the blue color (i.e., indicated as BG_B) of the logo surrounding region LGG of the image (S350). Next, the method of FIG. 5 can determine the high-gray-scale maximum luminance (i.e., indicated as TG) of the logo estimate region LEG of the image near the background maximum luminance (i.e., indicated as BG) of the logo surrounding region LGG of the image (S360).

In some example embodiments, the high-gray-scale maximum luminance (i.e., indicated as TG) of the logo estimate region LEG of the image can be set or determined to be greater than the background maximum luminance (i.e., indicated as BG) of the logo surrounding region LGG of the image. In some example embodiments, the high-gray-scale maximum luminance (i.e., indicated as TG) of the logo estimate region LEG of the image can be set or determined to be less than the background maximum luminance (i.e., indicated as BG) of the logo surrounding region LGG of the image as long as the image distortion of the logo estimate region LEG of the image is substantially invisible. Next, the method of FIG. 5 can adjust the gamma curve (i.e., indicated as GC) of the logo estimate region LEG of the image to control luminance of an entire gray-scale range of the gamma curve (i.e., indicated as GC) of the logo estimate region LEG of the image to be less than the high-gray-scale maximum luminance (i.e., indicated as TG) of the logo estimate region LEG of the image.

Figure 12:
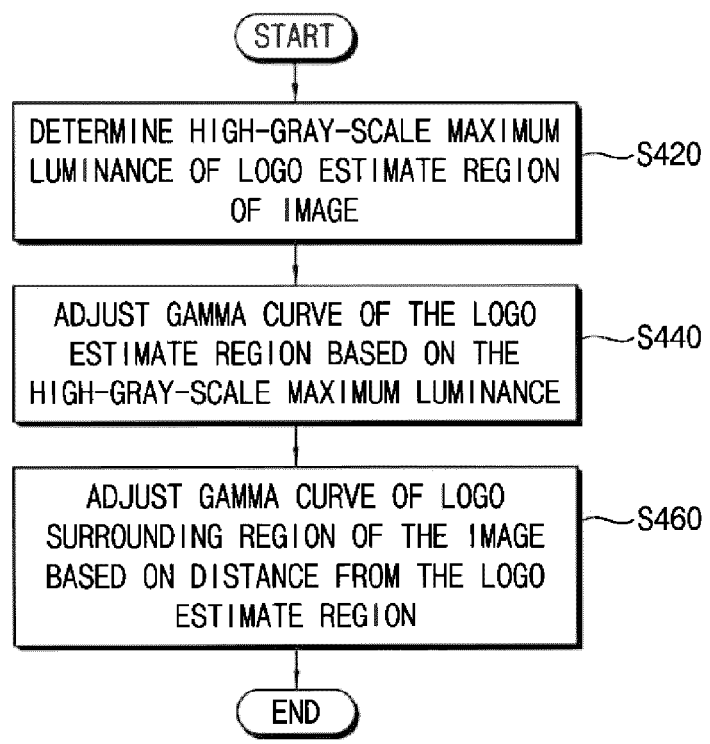
FIG. 12 is a flowchart illustrating a process in which a gamma curve of a logo surrounding region of an image is adjusted by the method of FIG. 5 based on a distance from a logo estimate region of the image.
Figure 13:
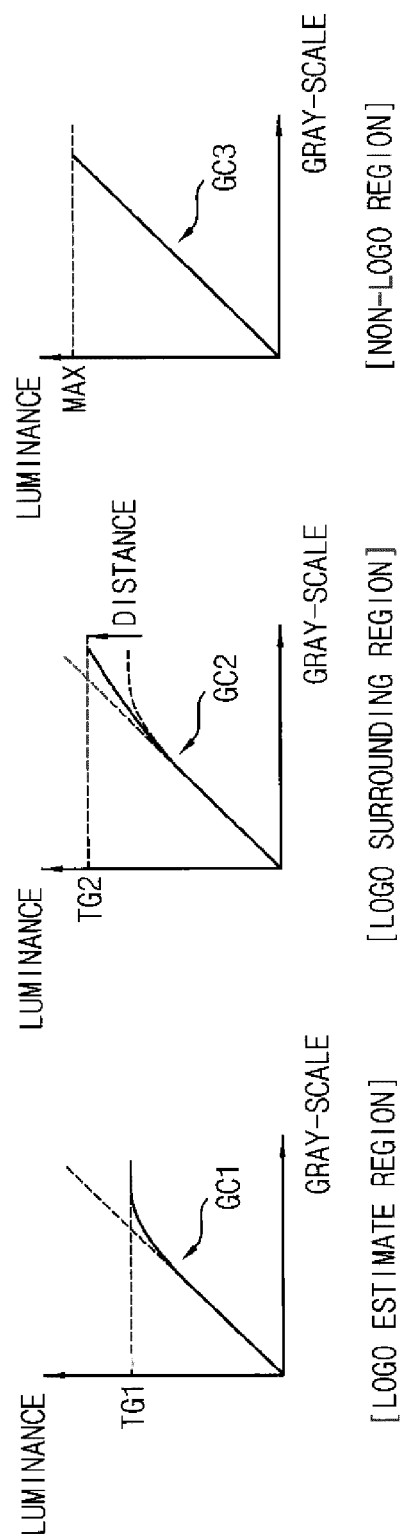
FIG. 13 is a diagram for describing a process in which a gamma curve of a logo surrounding region of an image is adjusted by the method of FIG. 5 based on a distance from a logo estimate region of the image.

FIG. 12 is a flowchart illustrating a process in which a gamma curve of a logo surrounding region of an image is adjusted by the method of FIG. 5 based on a distance from a logo estimate region of the image. FIG. 13 is a diagram for describing a process in which a gamma curve of a logo surrounding region of an image is adjusted by the method of FIG. 5 based on a distance from a logo estimate region of the image.

Referring to FIGS. 12 and 13, the method of FIG. 5 can adjust the gamma curve (i.e., indicated as GC2) of the logo surrounding region LGG of the image based on the high-gray-scale maximum luminance of the logo surrounding region LGG of the image when the method of FIG. 5 adjusts the gamma curve (i.e., indicated as GC1) of the logo estimate region LEG of the image. Since a gray-scale discontinuity between the logo estimate region LEG of the image and the logo surrounding region LGG of the image occurs when only the gamma curve (i.e., indicated as GC1) of the logo estimate region LEG of the image is adjusted, the method of FIG. 5 can adjust the gamma curve (i.e., indicated as GC2) of the logo surrounding region LGG of the image as well as the gamma curve (i.e., indicated as GC1) of the logo estimate region LEG of the image.

Specifically, the method of FIG. 5 can determine the high-gray-scale maximum luminance (i.e., indicated as TG1) of the logo estimate region LEG of the image (S420) and then can adjust the gamma curve (i.e., indicated as GC1) of the logo estimate region LEG of the image based on the high-gray-scale maximum luminance (i.e., indicated as TG1) of the logo estimate region LEG of the image (S440). Subsequently, the method of FIG. 5 can adjust the gamma curve (i.e., indicated as GC2) of the logo surrounding region LGG of the image based on the distance from the logo estimate region LEG of the image (S460). In this embodiment, the gamma curve (i.e., indicated as GC2) of the logo surrounding region LGG of the image can be adjusted based on the high-gray-scale maximum luminance (i.e., indicated as TG2) of the logo surrounding region LGG of the image.

For example, the method of FIG. 5 can set or determine the high-gray-scale maximum luminance (i.e., indicated as TG2) of the logo surrounding region LGG of the image to be greater than the high-gray-scale maximum luminance (i.e., indicated as TG1) of the logo estimate region LEG of the image. Here, as illustrated in FIG. 13, the method of FIG. 5 can increase the high-gray-scale maximum luminance (i.e., indicated as TG2) of the logo surrounding region LGG of the image as the distance from the logo estimate region LEG of the image increases (i.e., indicated as DISTANCE) to prevent a gray-scale discontinuity between the logo estimate region LEG of the image and the logo surrounding region LGG of the image. That is, the method of FIG. 5 can gradually reduce the amount of adjustment of the gamma curve (i.e., indicated as GC2) of the logo surrounding region LGG of the image as the distance from the logo estimate region LEG of the image increases (i.e., indicated as DISTANCE). Meanwhile, since the gamma curve (i.e., indicated as GC3) of the non-logo region NLG of the image is not adjusted, a high-gray-scale maximum luminance (i.e., indicated as MAX) of the non-logo region NLG of the image can be the maximum value supported by the display panel.

Figure 14:
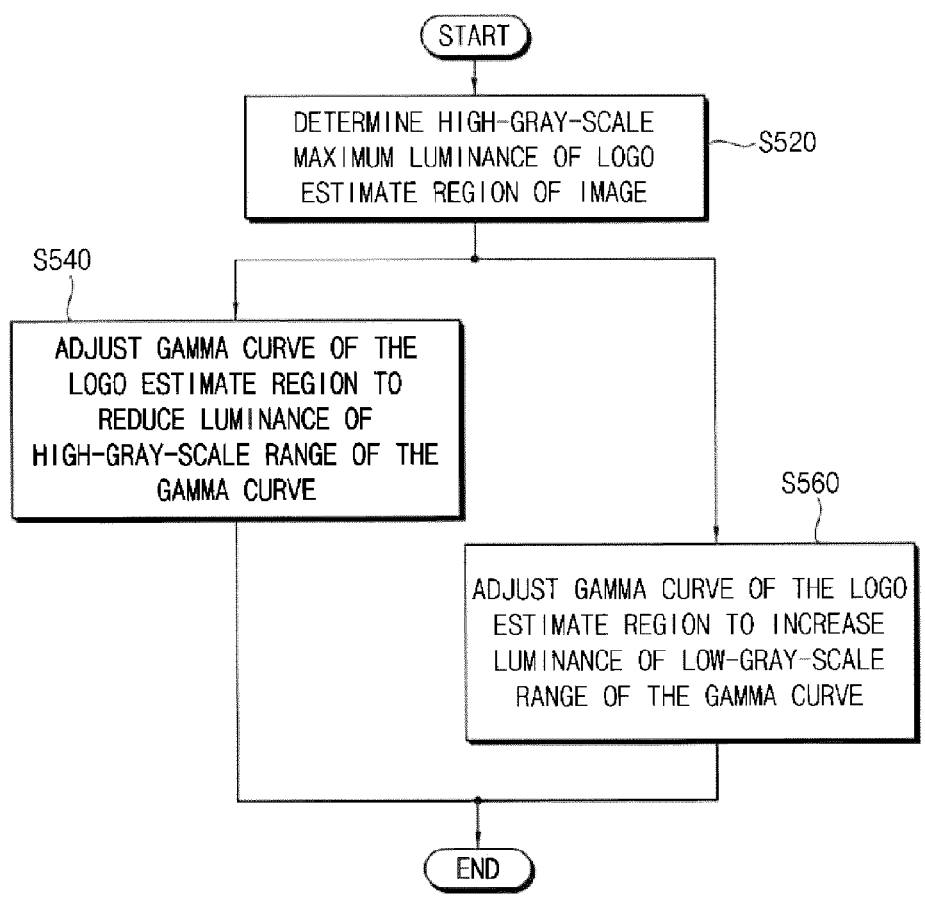
FIG. 14 is a flowchart illustrating a process in which a gamma curve of a logo estimate region of an image is adjusted by the method of FIG. 5 in a high-gray-scale range and in a low-gray-scale range.
Figure 15:
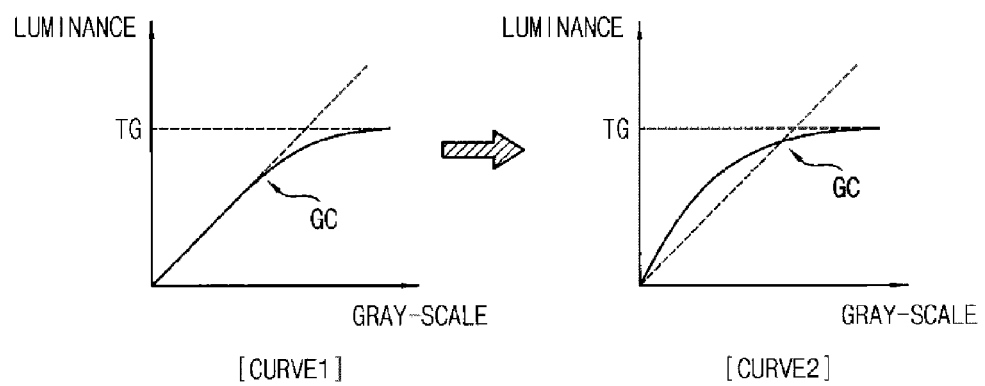
FIG. 15 is a diagram for describing a process in which a gamma curve of a logo estimate region of an image is adjusted by the method of FIG. 5 in a high-gray-scale range and in a low-gray-scale range.

FIG. 14 is a flowchart illustrating a process in which a gamma curve of a logo estimate region of an image is adjusted by the method of FIG. 5 in a high-gray-scale range and in a low-gray-scale range. FIG. 15 is a diagram for describing a process in which a gamma curve of a logo estimate region of an image is adjusted by the method of FIG. 5 in a high-gray-scale range and in a low-gray-scale range.

Referring to FIGS. 14 and 15, the method of FIG. 5 can increase the luminance of a low-gray-scale range that is less than a predetermined gray-scale on the gamma curve (i.e., indicated as GC) of the logo estimate region LEG of the image when the method of FIG. 5 reduces the luminance of a high-gray-scale range that is greater than the predetermined gray-scale on the gamma curve (i.e., indicated as GC) of the logo estimate region LEG of the image.

Specifically, the method of FIG. 5 can determine the high-gray-scale maximum luminance (i.e., indicated as TG) of the logo estimate region LEG of the image (S520) and then adjust the gamma curve (i.e., indicated as GC) of the logo estimate region LEG of the image to reduce the luminance of the high-gray-scale range of the gamma curve (i.e., indicated as GC) of the logo estimate region LEG of the image based on the high-gray-scale maximum luminance (i.e., indicated as TG) of the logo estimate region LEG of the image (S540). Thus, as illustrated in FIG. 15, the gamma curve (i.e., indicated as GC) of the logo estimate region LEG of the image can have a first curve shape (i.e., indicated as CURVE1).

Subsequently, the method of FIG. 5 can adjust the gamma curve (i.e., indicated as GC) of the logo estimate region LEG of the image to increase the luminance of the low-gray-scale range of the gamma curve (i.e., indicated as GC) of the logo estimate region LEG of the image (S560). Thus, as illustrated in FIG. 15, the gamma curve (i.e., indicated as GC) of the logo estimate region LEG of the image can have a second curve shape (i.e., indicated as CURVE2).

As described above, the method of FIG. 5 can use the logo estimate region LEG of the image rather than the logo region of the image when the method of FIG. 5 reduces the luminance of the logo region of the image. Here, the method of FIG. 5 can reduce the luminance of the logo region of the image by adjusting the gamma curve (i.e., indicated as GC) of the logo estimate region LEG of the image. In the logo estimate region LEG of the image, the logo region of the image can have a gray-scale higher than that of the region other than the logo region of the image. That is, in the logo estimate region LEG of the image, the logo region of the image can have a relatively high gray-scale (i.e., relatively high luminance) and the regions other than the logo region of the image can have a relatively low gray-scale (i.e., relatively low luminance). Thus, the method of FIG. 5 can minimize or reduce a gray-scale difference between the logo region of the image and the region other than the logo region of the image in the logo estimate region LEG of the image by reducing the luminance of the high-gray-scale range of the gamma curve (i.e., indicated as GC) of the logo estimate region LEG of the image and by increasing the luminance of the low-gray-scale range of the gamma curve (i.e., indicated as GC) of the logo estimate region LEG of the image.

Figure 16:
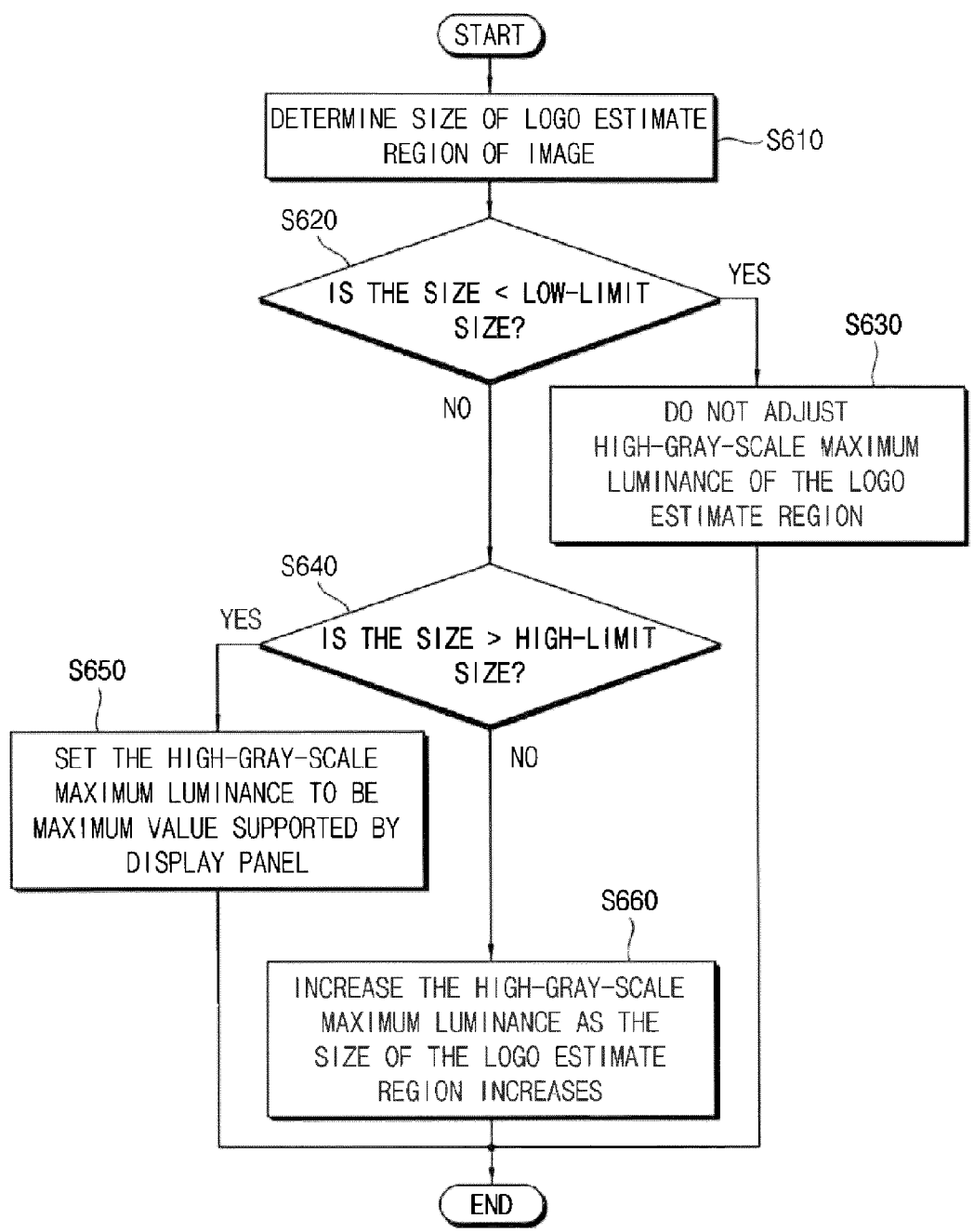
FIG. 16 is a flowchart illustrating a process in which high-gray-scale maximum luminance of a logo estimate region of an image is adjusted by the method of FIG. 5 based on a size of the logo estimate region of the image.
Figure 17:
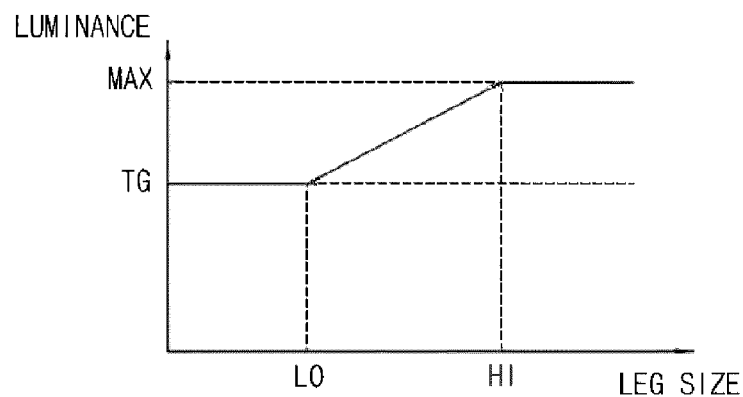
FIG. 17 is a diagram for describing a process in which high-gray-scale maximum luminance of a logo estimate region of an image is adjusted by the method of FIG. 5 based on a size of the logo estimate region of the image.

FIG. 16 is a flowchart illustrating a process in which high-gray-scale maximum luminance of a logo estimate region of an image is adjusted by the method of FIG. 5 based on the size of the logo estimate region of the image. FIG. 17 is a diagram for describing a process in which high-gray-scale maximum luminance of a logo estimate region of an image is adjusted by the method of FIG. 5 based on the size of the logo estimate region of the image.

Referring to FIGS. 16 and 17, the method of FIG. 5 can selectively adjust the high-gray-scale maximum luminance (i.e., indicated as TG) of the logo estimate region LEG of the image based on the size of the logo estimate region LEG of the image under substantially the same conditions.

Specifically, the method of FIG. 5 can determine the size of the logo estimate region LEG of the image (S610) and check whether the size of the logo estimate region LEG of the image is less than a predetermined low-limit size LO (S620). Here, when the size of the logo estimate region LEG of the image is less than the predetermined low-limit size LO, the method of FIG. 5 may not adjust the high-gray-scale maximum luminance (i.e., indicated as TG) of the logo estimate region LEG of the image (S630). That is, the method of FIG. 5 may not reduce the amount of adjustment of the gamma curve (i.e., indicated as GC) of the logo estimate region LEG of the image because the visibility of the image distortion is relatively low when the size of the logo estimate region LEG of the image is less than the predetermined low-limit size LO.

On the other hand, when the size of the logo estimate region LEG of the image is greater than the predetermined low-limit size LO, the method of FIG. 5 can check whether the size of the logo estimate region LEG of the image is greater than a predetermined high-limit size HI (S640). Here, when the size of the logo estimate region LEG of the image is greater than the predetermined high-limit size HI, the method of FIG. 5 can set the high-gray-scale maximum luminance (i.e., indicated as TG) of the logo estimate region LEG of the image to be a maximum value (i.e., indicated as MAX) supported by the display panel (S650).

That is, the method of FIG. 5 can set the high-gray-scale maximum luminance (i.e., indicated as TG) of the logo estimate region LEG of the image to be the maximum value (i.e., indicated as MAX) in order not to adjust the gamma curve (i.e., indicated as GC) of the logo estimate region LEG of the image because the visibility of the image distortion is relatively high when the size of the logo estimate region LEG of the image is greater than the predetermined high-limit size HI.

On the other hand, when the size of the logo estimate region LEG of the image is less than the predetermined high-limit size HI, the method of FIG. 5 can increase the high-gray-scale maximum luminance (i.e., indicated as TG) of the logo estimate region LEG of the image as the size of the logo estimate region LEG of the image increases (S660). That is, the method of FIG. 5 can increase the high-gray-scale maximum luminance (i.e., indicated as TG) of the logo estimate region LEG of the image to reduce the amount of adjustment of the gamma curve (i.e., indicated as GC) of the logo estimate region LEG of the image because the visibility of the image distortion increases as the size of the logo estimate region LEG of the image increases. In brief, the method of FIG. 5 selectively adjusts the high-gray-scale maximum luminance (i.e., indicated as TG) of the logo estimate region LEG of the image based on the size of the logo estimate region LEG of the image under substantially the same conditions, so that the gamma curve (i.e., indicated as GC) of the logo estimate region LEG of the image can be adjusted as long as the image distortion of the logo estimate region LEG of the image is substantially invisible.

Figure 18:
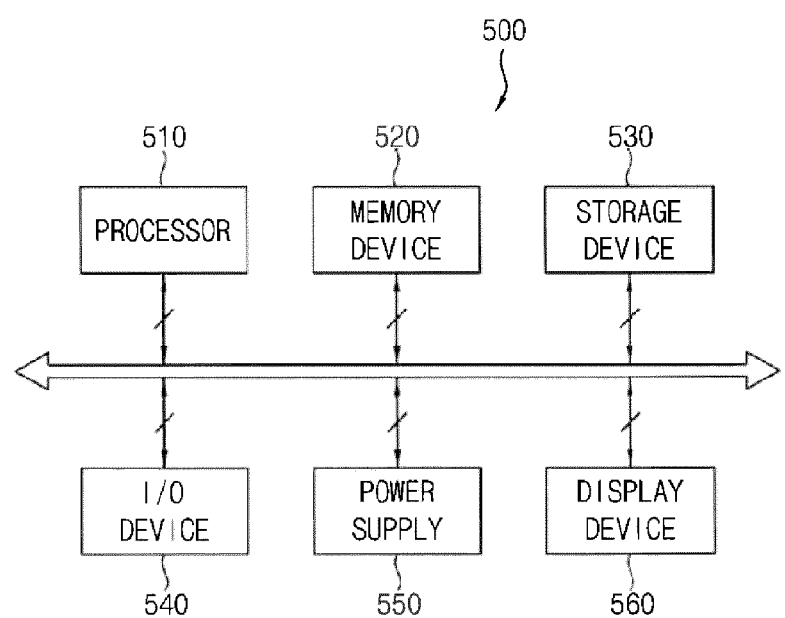
FIG. 18 is a block diagram illustrating an electronic device according to example embodiments.
Figure 19:
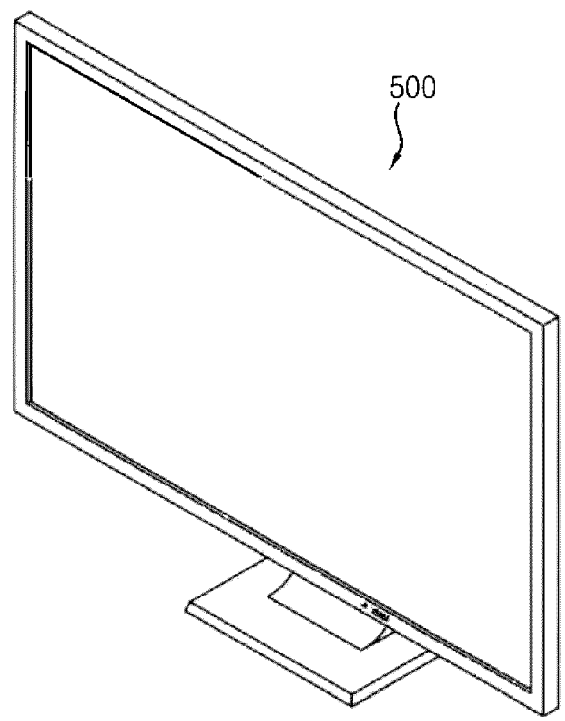
FIG. 19 is a diagram illustrating an example in which the electronic device of FIG. 18 is implemented as a television.
Figure 20:
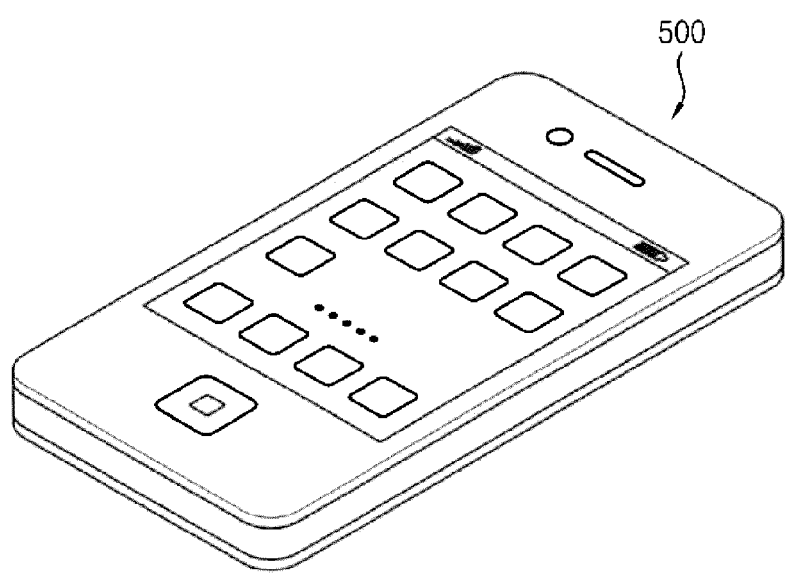
FIG. 20 is a diagram illustrating an example in which the electronic device of FIG. 18 is implemented as a smart phone.

FIG. 18 is a block diagram illustrating an electronic device according to example embodiments. FIG. 19 is a diagram illustrating an example in which the electronic device of FIG. 18 is implemented as a television. FIG. 20 is a diagram illustrating an example in which the electronic device of FIG. 18 is implemented as a smart phone.

Referring to FIGS. 18 through 20, the electronic device 500 can include a processor 510, a memory device or memory 520, a storage device 530, an input/output (I/O) device 540, a power supply 550, and a display device 560. Here, the display device 560 can correspond to the display device 100 of FIG. 1. In addition, the electronic device 500 can further include a plurality of ports for communicating with a video card, a sound card, a memory card, a universal serial bus (USB) device, other electronic devices, etc. In an example embodiment, as illustrated in FIG. 19, the electronic device 500 can be implemented as a television. In another example embodiment, as illustrated in FIG. 20, the electronic device 500 can be implemented as a smart phone. However, the electronic device 500 is not limited thereto. For example, the electronic device 500 can be implemented as a cellular phone, a video phone, a smart pad, a tablet computer, a car navigation system, a computer monitor, a laptop, a head mounted display (HMD), etc.

The processor 510 can perform various computing functions. The processor 510 can be a micro-processor, a central processing unit (CPU), an application processor (AP), etc. The processor 510 can be connected to other components via an address bus, a control bus, a data bus, etc. Further, the processor 510 can be connected to an extended bus such as a peripheral component interconnection (PCI) bus. The memory device 520 can store data for operations of the electronic device 500. For example, the memory device 520 can include at least one non-volatile memory device such as an erasable programmable read-only memory (EPROM) device, an EEPROM device, a flash memory device, a phase change random access memory (PRAM) device, a resistance random access memory (RRAM) device, a nano-floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 530 can be a solid state drive (SSD) device, a hard disk drive (HDD) device, a CD-ROM device, etc.

The I/O device 540 can include an input device such as a keyboard, a keypad, a mouse device, a touchpad, a touch-screen, etc. and an output device such as a printer, a speaker, etc. The power supply 550 can provide power for the operations of the electronic device 500. In some example embodiments, the display device 560 can be included in the I/O device 540. The display device 560 can be connected to other components via the buses or other communication links.

As described above, the display device 560 can alleviate or reduce a permanent afterimage caused due to a luminance difference or a color difference between a logo region of an image and a non-logo region of the image by detecting a logo estimate region of the image, determining a logo surrounding region of the image that surrounds the logo estimate region of the image, analyzing a histogram of the logo surrounding region of the image to detect background maximum luminance, determining high-gray-scale maximum luminance of the logo estimate region of the image based on the background maximum luminance, and adjusting a gamma curve of the logo estimate region of the image based on the high-gray-scale maximum luminance of the logo estimate region of the image.

Thus, the display device 560 can efficiently reduce the luminance of the logo region of the image without the need for accurately detecting the logo region of the image. For this operation, the display device 560 can include a display panel and a display driving integrated circuit that drives the display panel. The display panel can display an image including the logo region. The display driving integrated circuit can detect the logo estimate region of the image that surrounds the logo region of the image, determine the logo surrounding region of the image that surrounds the logo estimate region of the image, analyze the histogram of the logo surrounding region of the image to detect the background maximum luminance, determine the high-gray-scale maximum luminance of the logo estimate region of the image based on the background maximum luminance, and adjust the gamma curve of the logo estimate region of the image to control luminance of an entire gray-scale range of the gamma curve of the logo estimate region of the image to be less than the high-gray-scale maximum luminance of the logo estimate region of the image. Since these are described above, duplicated description will not be repeated.

The described technology can be applied to a display device (e.g., an OLED display) or an electronic device including the display device. For example, the described technology can be applied to a smart watch, a cellular phone, a smart phone, a video phone, a smart pad, a tablet computer, a car navigation system, a television, a computer monitor, a laptop, a head mounted display (HMD), etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the invention. Accordingly, all such modifications are intended to be included within the scope of the inventive technology as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display device, comprising:
    a display panel configured to display an image including a logo region; and
    a display driving integrated circuit configured to drive the display panel,
    wherein the display driving integrated circuit is further configured to:
        detect a logo estimate region of the image that surrounds the logo region of the image;
        determine a logo surrounding region of the image that surrounds the logo estimate region of the image;
        analyze a histogram of the logo surrounding region of the image so as to determine a background maximum luminance of the logo surrounding region of the image;
        determine a high-gray-scale maximum luminance of the logo estimate region of the image based at least in part on the background maximum luminance of the logo surrounding region of the image; and
        adjust a gamma curve of the logo estimate region of the image to control luminance of an entire gray-scale range of the gamma curve of the logo estimate region of the image so as to be less than the high-gray-scale maximum luminance of the logo estimate region of the image.

2. The display device of claim 1, wherein the logo estimate region of the image has: i) a height that is greater than or equal to a maximum height of the logo region of the image and ii) a width that is greater than or equal to a maximum width of the logo region of the image.

3. The display device of claim 1, wherein the display driving integrated circuit is further configured to determine the background maximum luminance of the logo surrounding region of the image to be a maximum luminance of a single color of the logo surrounding region of the image when the logo surrounding region of the image includes only the single color.

4. The display device of claim 1, wherein the display driving integrated circuit is further configured to determine the background maximum luminance of the logo surrounding region of the image to be the greatest luminance among a maximum luminance of a red color, a maximum luminance of a green color, and a maximum luminance of a blue color of the logo surrounding region of the image when the logo surrounding region of the image has multiple colors including the red color, the green color, and the blue color.

5. The display device of claim 1, wherein the display driving integrated circuit is further configured to determine the high-gray-scale maximum luminance of the logo estimate region of the image within a predetermined range with respect to the background maximum luminance of the logo surrounding region of the image.

6. The display device of claim 5, wherein the display driving integrated circuit is further configured to reduce luminance of a high-gray-scale range that is greater than a predetermined gray-scale on the gamma curve of the logo estimate region of the image.

7. The display device of claim 6, wherein the display driving integrated circuit is further configured to increase luminance of a low-gray-scale range that is less than the predetermined gray-scale on the gamma curve of the logo estimate region of the image.

8. The display device of claim 5, wherein the display driving integrated circuit is further configured to adjust a gamma curve of the logo surrounding region of the image based at least in part on a high-gray-scale maximum luminance of the logo surrounding region of the image when the display driving integrated circuit adjusts the gamma curve of the logo estimate region of the image.

9. The display device of claim 8, wherein the display driving integrated circuit is further configured to:
determine the high-gray-scale maximum luminance of the logo surrounding region of the image to be greater than the high-gray-scale maximum luminance of the logo estimate region of the image; and
increase the high-gray-scale maximum luminance of the logo surrounding region of the image as the distance from the logo estimate region of the image increases.

10. The display device of claim 5, wherein the display driving integrated circuit is further configured to selectively adjust the high-gray-scale maximum luminance of the logo estimate region of the image based at least in part on the area of the logo estimate region of the image.

11. The display device of claim 10, wherein the display driving integrated circuit is further configured to increase the high-gray-scale maximum luminance of the logo estimate region of the image as the size of the logo estimate region of the image increases.

12. The display device of claim 10, wherein the display driving integrated circuit is further configured to not adjust the high-gray-scale maximum luminance of the logo estimate region of the image when the size of the logo estimate region of the image is less than a predetermined low-limit size.

13. The display device of claim 10, wherein the display driving integrated circuit is further configured to set the high-gray-scale maximum luminance of the logo estimate region of the image to be a maximum value supported by the display panel when the size of the logo estimate region of the image is greater than a predetermined high-limit size.

14. The display device of claim 1, wherein the display driving integrated circuit comprises:
a scan driver configured to provide a plurality of scan signals to the display panel;
a data driver configured to provide a plurality of data signals to the display panel;
a logo controller configured to adjust the gamma curve of the logo estimate region of the image; and
a timing controller configured to control the scan driver, the data driver, and the logo controller.

15. The display device of claim 14, wherein the logo controller is located inside the timing controller or outside of the timing controller and wherein the logo controller is configured to communicate with the timing controller.

16. A method of adjusting image luminance for a display device, the method comprising:
displaying, at a display panel, an image including a logo region;
detecting, at a display driving integrated circuit, a logo estimate region of the image that surrounds the logo region of the image;
determining, at a display driving integrated circuit, a logo surrounding region of the image that surrounds the logo estimate region of the image;
detecting, at a display driving integrated circuit, a background maximum luminance of the logo surrounding region of the image via analyzing a histogram of the logo surrounding region of the image;
determining, at a display driving integrated circuit, a high-gray-scale maximum luminance of the logo estimate region of the image based at least in part on the background maximum luminance of the logo surrounding region of the image; and
adjusting, at a display driving integrated circuit, a gamma curve of the logo estimate region of the image so as to control luminance of an entire gray-scale range of the gamma curve of the logo estimate region of the image to be less than the high-gray-scale maximum luminance of the logo estimate region of the image.

17. The method of claim 16, wherein the logo estimate region of the image has a height that is greater than or equal to a maximum height of the logo region of the image and a width that is greater than or equal to a maximum width of the logo region of the image.

18. The method of claim 16, further comprising determining the background maximum luminance of the logo surrounding region of the image to be a maximum luminance of a single color of the logo surrounding region of the image when the logo surrounding region of the image includes only the single color.

19. The method of claim 16, further comprising determining the background maximum luminance of the logo surrounding region of the image to be the highest luminance among a maximum luminance of a red color, a maximum luminance of a green color, and a maximum luminance of a blue color of the logo surrounding region of the image when the logo surrounding region of the image has multiple colors including the red color, the green color, and the blue color.

20. The method of claim 16, further comprising determining the high-gray-scale maximum luminance of the logo estimate region of the image within a predetermined range with respect to the background maximum luminance of the logo surrounding region of the image.

* * * * *